（12）United States Patent
Hundley et al.

(10) Patent No.: US 8,206,583 B2
(45) Date of Patent: Jun. 26, 2012

(54) ELECTRICALLY CONDUCTIVE FLUID TREATMENT ELEMENTS

(75) Inventors: Ronald D. Hundley, Manlius, NY (US); Scott A. Whitney, Marathon, NY (US); Angela M. Griffin, Homer, NY (US); Conrad J. Christel, Dryden, NY (US); Leonard E. Bensch, Glen Cove, NY (US); Kenneth M. Williamson, Jamesville, NY (US); Joseph G. Adiletta, Thompson, CT (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 12/198,395

(22) Filed: Aug. 26, 2008

(65) Prior Publication Data

US 2009/0014378 A1   Jan. 15, 2009

Related U.S. Application Data

(62) Division of application No. 11/515,813, filed on Sep. 6, 2006, now Pat. No. 7,455,768, which is a division of application No. 10/130,831, filed as application No. PCT/US00/31949 on Nov. 22, 2000, now Pat. No. 7,128,835.

(60) Provisional application No. 60/202,879, filed on May 9, 2000, provisional application No. 60/166,991, filed on Nov. 23, 1999.

(51) Int. Cl.
  *B01D 39/14* (2006.01)
(52) U.S. Cl. ............... 210/243; 210/489; 210/493.1; 210/504; 210/505; 210/508; 210/509

(58) Field of Classification Search ............... 210/243, 210/489–491, 493.1, 500.1, 505, 509, 504, 210/508; 361/215; 96/67, 69, 98; 428/315.5, 428/315.7, 315.9, 367; 442/340, 341, 348, 442/414
See application file for complete search history.

(56) References Cited

U.S. PATENT DOCUMENTS

| 3,158,532 | A | * | 11/1964 | Pall et al. | 210/505 |
|---|---|---|---|---|---|
| 3,933,643 | A | * | 1/1976 | Colvin et al. | 210/243 |
| 5,252,207 | A | * | 10/1993 | Miller et al. | 210/335 |
| 5,368,913 | A | * | 11/1994 | Ortega | 428/198 |

(Continued)

FOREIGN PATENT DOCUMENTS

DE           33 25 526 C1   4/1985

(Continued)

OTHER PUBLICATIONS

PCT Written Opinion for PCT/US00/31949.

*Primary Examiner* — Matthew Savage
(74) *Attorney, Agent, or Firm* — Leydig, Voit & Mayer, Ltd.

(57) ABSTRACT

Fluid treatment elements substantially inhibit electrical charge imbalances and/or build-ups of electrical charges. A fluid treatment element may comprise a multilayer composite including an electrically conductive fibrous matrix, having an upstream side and a downstream side, disposed on a porous substrate, also having an upstream side and a downstream side, which supports the fibrous matrix. The fibrous matrix may include a combination of conductive and nonconductive fibers. The multilayer composite may also include a drainage layer positioned along one of the upstream side of the fibrous matrix and the downstream side of the porous substrate.

18 Claims, 8 Drawing Sheets

U.S. PATENT DOCUMENTS

| | | | | |
|---|---|---|---|---|
| 5,380,432 A | * | 1/1995 | Brandt | 210/243 |
| 5,798,048 A | | 8/1998 | Reis | |
| 6,099,726 A | * | 8/2000 | Gembolis et al. | 210/243 |

FOREIGN PATENT DOCUMENTS

| | | |
|---|---|---|
| JP | 48-089665 U | 10/1973 |
| JP | 57-066617 U | 10/1980 |
| JP | 58-041933 A | 3/1983 |
| JP | 64-017314 U | 1/1989 |
| JP | 05-049825 A | 3/1993 |
| JP | 06-123051 A | 5/1994 |
| JP | 08-323122 A | 12/1996 |
| JP | 10-015314 A | 1/1998 |
| JP | 11-047522 A | 2/1999 |
| JP | 11-104426 A | 4/1999 |
| WO | WO 94/11082 A1 | 5/1994 |

* cited by examiner

ELECTRICALLY CONDUCTIVE FLUID TREATMENT ELEMENTS

This application is a divisional of U.S. patent application Ser. No. 11/515,813, filed on Sep. 6, 2006, now U.S. Pat. No. 7,455,768, which was a divisional of U.S. patent application Ser. No. 10/130,831, filed on Dec. 5, 2002, now U.S. Pat. No. 7,128,835, which was a National Stage Application of International Application No. PCT/US00/31949, filed on Nov. 22, 2000, which claimed the benefit of U.S. Provisional Patent Application No. 60/202,879, filed on May 9, 2000, and U.S. Provisional Patent Application No. 60/166,991, filed on Nov. 23, 1999.

TECHNICAL FIELD OF THE INVENTION

The present invention relates to fluid treatment elements, particularly to electrically conductive fluid treatment elements which substantially inhibit electrical imbalances and/or electrical charge build ups.

BACKGROUND OF THE INVENTION

A wide variety of elements are used to treat fluids, i.e., gases, liquids, and mixtures of gases and liquids. Examples of fluid treatment elements include separation elements, such as filter elements and separator elements, coalescer elements, and mass transfer elements. They may be used in a wide variety of ways including to remove one or more substances, such as solids, liquids or chemical substances, e.g., a protein, from a gas or liquid; to concentrate or deplete one or more substances in a gas or liquid; to accrete one phase of a fluid, e.g., a liquid discontinuous phase, in another phase of the fluid, e.g., a continuous liquid or gas phase; or to transfer mass, such as a gaseous or chemical substance, between two fluid streams. In use, any of these elements may develop an electrical change imbalance or buildup that can potentially damage the fluid treatment system.

For example, filter elements, in addition to removing contaminants such as solids from fluids, may remove or add electrons to fluid passing through the filter elements, causing an imbalance in electrical charge or potential between the fluid, the filter element, and/or the surrounding housing, pipes, and fluid cavities. A gradual buildup of electrical charge may eventually lead to a discharge through a path of least resistance to, for example, the filter housing, the pipes, or any other conductive component such as a turbine-bearing cage. This discharge can degrade the fluid or harm the components experiencing a discharge arc. The service life of the fluid, the filter element, and the system containing the fluid is thus reduced.

Various techniques exist that purport to deal with the accumulation of charge and the resulting discharge in fluid treatment systems. One technique is to add conductive additives to the fluid. This technique can degrade fluid performance and also requires regular monitoring as the additive's effectiveness diminishes over time and use.

SUMMARY OF THE INVENTION

The present invention effectively addresses the problems of electrical imbalances and charge accumulation in a variety of ways.

In accordance with an aspect of the invention, a fluid treatment element for substantially inhibiting an electrical charge imbalance and/or a build-up of electrical charge may comprise a multilayer composite. The multilayer composite may include an electrically conductive fibrous matrix having a first side and a second side and including a combination of electrically conductive fibers and electrically nonconductive fibers. The electrically conductive fibers of the electrically conductive fibrous matrix may include electrically conductive carbon fibers and may substantially inhibit an electrical charge imbalance and/or a build-up of electrical charge. The electrically conductive fibers may comprise less than about 50% by weight of the electrically conductive fibrous matrix and may have diameters of about 10 μm or less. The multilayer composite may also include a porous substrate for supporting the electrically conductive fibrous matrix. The porous substrate may have a first side and a second side and the second side of the electrically conductive fibrous matrix may be disposed on the first side of the porous substrate. The multilayer composite may also include a first drainage layer positioned on the first side of the electrically conductive fibrous matrix or the second side of the porous substrate.

Many embodiments of the fluid treatment elements effectively inhibit electrical imbalance and charge buildup (1) by dissipating the charge to a neutral potential such as ground and/or (2) by preventing the charge from accumulating in the filter medium.

For some embodiments, the fluid treatment element may comprise a pleated multi-layer composite having interior roots and exterior crests.

For some embodiments, the fluid treatment element may be used in a fluid treatment assembly having a core or a cage such that the fluid treatment element is removably mountable to the core or the cage.

DETAILED DESCRIPTION OF EMBODIMENTS

One example of a fluid treatment element is a separation element, such as a filter element. Accordingly, a fluid treatment pack such as a filter pack comprises first and second conductive layers and a porous fluid treatment medium such as a porous filter medium. The first and second conductive layers are preferably electrically connected to each other, and the filter medium is disposed between them. As a fluid, such as gas or a liquid or a mixture of gas and liquid, flows through the filter pack, one or more undesirable substances, e.g., particulate contaminants may be removed from the fluid by the filter medium. In addition, an electrical charge may be transferred between the fluid and the filter medium. The first and second conductive layers are preferably positioned in sufficient proximity to the filter medium to offset the electrical imbalance, for example, by dissipating the charge to a neutral potential, such as ground, or where the first and second conductive layers are isolated from the neutral potential, by collecting the charge in the fluid treatment medium and returning the charge to the fluid as the fluid flows through the conductive layers or by preventing the charge from accumulating in the filter medium. Thus, the conductive layers may be electrically connected to ground or alternatively, even if the filter pack is electrically isolated from the ambient environment, e.g., electrically isolated from a neutral potential such as ground, the first and/or second conductive layers may offset all or a substantial portion of the electrical imbalance which may arise in the filter medium. The fluid treatment medium is thus substantially surrounded by an electrical cage which offsets the electrical imbalance.

Figure 1:
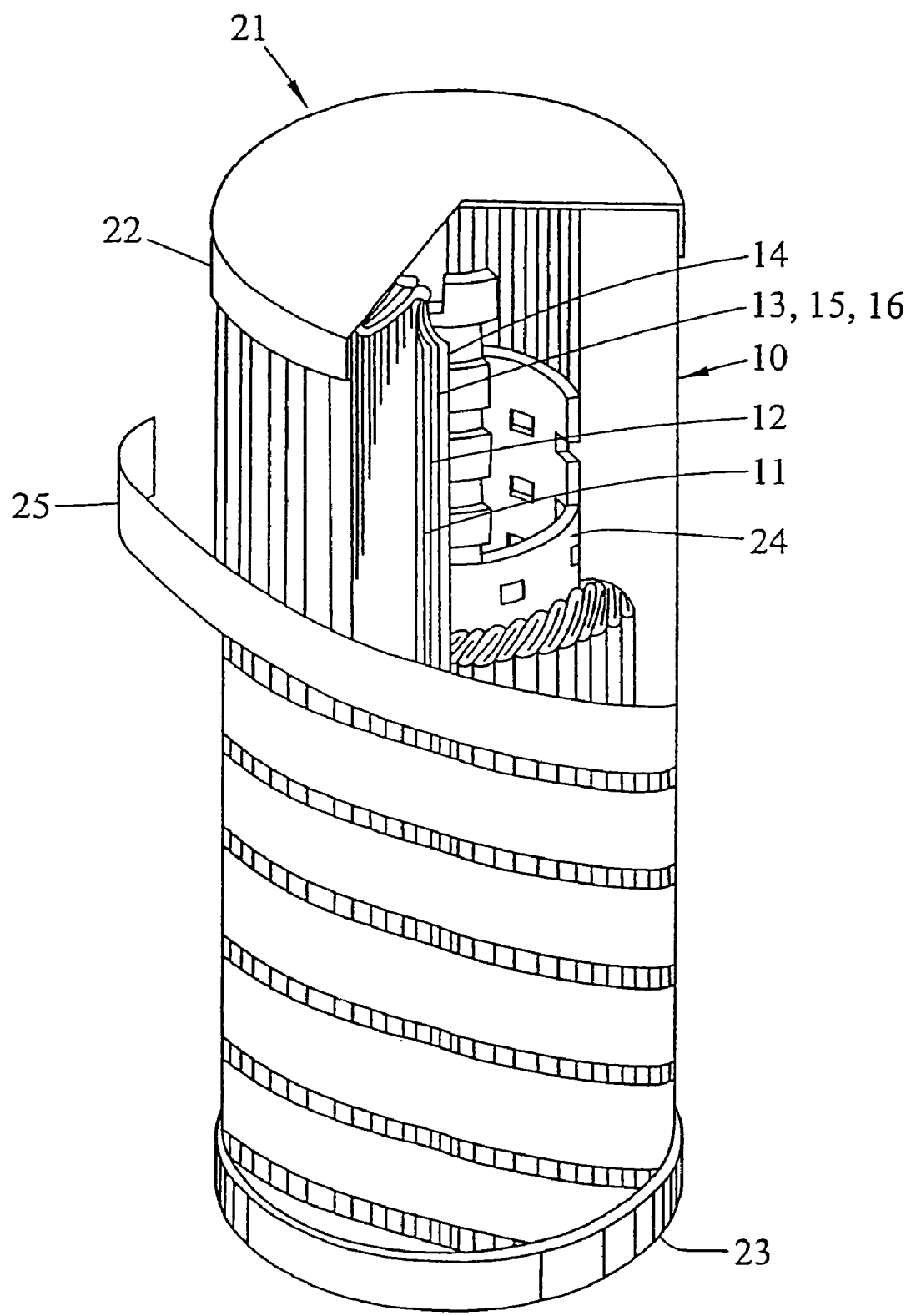
FIG. 1 is a partially cutaway oblique view of a fluid treatment element.

As shown in FIG. 1, one example of a fluid treatment pack, such as filter pack 10, embodying the present invention has a pleated, hollow, generally cylindrical configuration, and fluid preferably flows outside-in, or alternatively inside-out, through the filter pack 10. The pleats may extend generally radially and have a height substantially equal to (D−d)/2, where D and d are the outer and inner diameters, respectively, at the crests and roots of the pleats. Alternatively, the pleats may extend in a non-radial direction and have a height greater than (D−d)/2. For example, the pleats may lie in a laid-over state as disclosed in U.S. Pat. No. 5,543,047, which is incorporated by reference in its entirety.

The filter pack 10 preferably comprises a pleated, multilayer composite having a porous upstream drainage layer 11, a porous conductive cushioning layer 12, a permeable or semipermeable filter medium 13, and a porous conductive downstream drainage layer 14. The porous fluid treatment medium, e.g., the filter medium 13, may comprise a porous fluid treatment matrix such as a filter matrix 15, e.g., a fibrous, including filamentous, layer, and the fiber matrix 15 may be supported by a porous substrate 16. For example, the fiber matrix 15 may be dry-laid or wet-laid on a porous substrate 16 disposed immediately downstream of and in intimate contact, preferably intimate bonded contact, with the filter matrix 15. The conductive cushioning layer 12 and the conductive downstream drainage layer 14 may then comprise the first and second conductive layers in this embodiment with the filter medium 13 disposed between them.

The upstream drainage layer 11 may be fashioned from a wide variety of materials having suitable drainage characteristics. For example, the edgewise flow resistance of the upstream drainage layer is preferably sufficiently low that fluid flowing through the filter pack is well distributed along the upstream surface of the filter medium from the crests to the roots of the pleats. The upstream drainage layer may be, for example, in the form of a mesh, e.g., a woven, knitted, extruded, or expanded mesh; a screen; a netting; or a woven or non-woven sheet. The upstream drainage layer may be formed of a nonconductive material, such as glass or ceramic fibers or a nonconductive polymer, or a conductive material, e.g., a conductive material such as a metal, carbon, or a conductive polymer, or a nonconductive material that has been treated to render it conductive, such as a carbon or metal coated nonconductive glass or polymer. In the illustrated embodiment, the upstream drainage layer 11 preferably comprises a nonconductive extruded polyamide (e.g., nylon) mesh.

The conductive cushioning layer may be fashioned from any suitable material which resists abrasion between the upstream drainage layer 11 and the filter matrix 15. For example, the conductive cushioning layer 11 may be fashioned as a smooth and, preferably, thin and tough woven or non-woven sheet which is relatively porous compared to the filter medium 13, e.g., the filter matrix 15. The conductive cushioning layer 11 may be formed from a conductive material, such as a metal, carbon, or a conductive polymer, or from a nonconductive material, such as glass fiber or a nonconductive polymer, which is treated in any suitable manner to render the cushioning layer conductive. For example, a conductive additive, such as metal, carbon, or conductive polymeric particles or fibers, may be included with the nonconductive material or the nonconductive material may be coated with a conductive coating, such as a metal or carbon coating. In the illustrated embodiment, the conductive cushioning layer 12 preferably comprises a conductive nonwoven sheet, such as a carbon-coated polyester nonwoven sheet.

The fibrous filter matrix 15 may be fashioned from a variety of fibrous, including filamentous, materials. For example, the filter matrix 15 may be fashioned from only nonconductive materials, such as glass fibers, e.g., borosilicate fibers, nonconductive polymeric fibers, including non-conductive synthetic polymeric fibers, or ceramic fibers, such as alumina, silica, silicates or quartz. Alternatively, the filter matrix 15 may be fashioned from a mixture of nonconductive fibers and a conductive material, e.g., metal, carbon, or conductive polymer particles or fibers. The term "metal" herein refers to a metal by itself as well as blends of metals such as alloys. Examples of suitable metals include iron, copper, aluminum, nickel, gold, silver, and alloys that include one or more of metals or conductive materials such as carbon. Examples of alloys include stainless steel, bronze, and brass.

The fibers can have any suitable dimensions. For example, the conductive fibers or the non-conductive fibers can have a diameter of from about 1 μm or less to about 100 μm or more, for example, in some embodiments, from about 1 μm to about 10 μm, e.g., from about 1 μm to about 3 μm. The conductive fibers can be incorporated within the non-conductive fiber matrix in an amount that imparts the desired electrical conductivity to the filter matrix, for example, less than about 50%, typically up to about 25% or more, in some embodiments from about 15% to about 25%, e.g., from about 22% to about 25% by weight of the filter matrix.

The filter matrix 15 can be prepared by any suitable method, including by dry-laying or wet-laying. For example, a slurry containing a mixture of conductive fibers (e.g., metal fibers) and non-conductive fibers can be prepared. Alternatively, a slurry of the conductive fiber and a slurry of the non-conductive fiber can be prepared separately and the slurries admitted to a mixing chamber where the slurries are mixed. The slurries can be prepared in any suitable carrier, e.g., water or alcohol. As the viscosity of the metal fiber is generally higher than that of most non-conductive fibers, the viscosity and/or the flow rate of the slurries may be suitably adjusted to obtain the desired metal content and uniformity of metal distribution in the filter matrix. The slurries can also include additives such as binders, e.g., resins, to improve the bonding of the fibers to one another and/or suspension aids such as surfactants or thickeners to stabilize the slurries.

The mixture is processed to form a matrix or web. The matrix can be formed by any suitable method, e.g., by methods known in the production of non-woven fabrics or webs such as paper. The matrix of conductive and non-conductive fibers can be laid on a surface, such as a screen, on which a matrix can be formed and from which the thus formed matrix can be later removed. The matrix of conductive and non-conductive fibers can also be laid on porous support, such as a conductive or non-conductive substrate to form a composite filter medium. For example, a forming-machine such as an inclined-wire fourdriner or a cylinder former can be employed for forming the matrix. By applying suction or vacuum during the formation of the matrix, one can remove the carrier as well as adjust the thickness, porosity, or density of the matrix. The matrix obtained can be subjected to bonding processes, e.g., stitching, needle-felting or calendaring, to better interlock the fibers or to improve or adjust the strength, flexibility, porosity, density, loft, and/or thickness of the matrix.

The filter matrix 15 may have any of several fluid treating characteristics. For example, the filter matrix or the filter medium may have a removal rating in the range from about 0.05µ or less to about 100µ or more, preferably less than about 25µ or less than about 5µ or less than about 1µ. The filter matrix or the filter medium may have a uniform or graded pore structure, i.e., an upstream region having larger pores and a downstream region having finer pores, and/or may comprise a single layer or multiple sublayers, each having the same or different filtering characteristics. In the illustrated embodiment, the filter matrix 15 comprises a wet-laid, resin-bonded glass fiber layer.

The porous substrate 16 may be fashioned from a variety of suitable materials. The filter matrix 15 preferably is laid on the substrate 16, e.g., dry-laid or wet-laid, and is bonded to the substrate 16, e.g., chemically bonded, solvent bonded, thermally bonded, and/or mechanically bonded by mechanical entanglement of the fibers of the filter matrix and the substrate, forming a composite filter medium. The substrate 16 then supports the filter matrix 15 against the differential pressure across the filter matrix 15. The substrate 16 may be, for example, a mesh, screen, netting, or woven or non-woven sheet that is sufficiently strong to support the filter matrix 15 within the filter pack 10. The porous substrate 16, like the upstream drainage layer, may be formed from a nonconductive material such as glass or ceramic fibers or a nonconductive polymer In the illustrated embodiment, the substrate 16 preferably comprises a nonconductive nonwoven sheet, such as a polymeric, e.g., polyester, nonwoven sheet.

The conductive downstream drainage layer 14 functions as a drainage layer in a manner analogous to the upstream drainage layer 11, except the downstream drainage layer 14 drains filtrate from the downstream side of the substrate from the crests to the roots of the pleats and into the interior of the filter pack 10. Consequently, many of the characteristics of the upstream drainage layer are applicable to the downstream drainage layer. Further, the downstream drainage layer may function as a conductive layer. The downstream drainage layer may then comprise a conductive material, such as a metal, carbon, or a conductive polymer, or a nonconductive material, such as glass fiber or a nonconductive polymer, which is treated in any suitable manner to render the downstream drainage layer conductive. A conductive additive, such as metal, carbon, or conductive polymeric particles or fibers, including filaments, may be included with the nonconductive material or the nonconductive material may be coated with a conductive coating, such as a metal or carbon coating. In the illustrated embodiment, the downstream drainage layer 14 preferably comprises a carbon-coated polyamide (e.g., nylon) extruded mesh.

The multi-layer composite may be pleated in any suitable manner and formed into a generally cylindrical filter pack 10, for example, by sealing a longitudinal side seam. The filter pack 10 may be incorporated into a filter element 21 in a variety of ways. For example, the ends of the filter pack 10 may be joined to opposite end caps 22, 23 in any suitable manner, such as melt bonding, adhesive bonding, or spin bonding. One of the end caps may be blind and the other may be open, or both end caps may be open. A cage (not shown) may be disposed around the exterior of the filter pack 10 and/or a core 24 may be disposed around the interior of the filter pack 10. Further, a wrap member 25 may be disposed around the exterior of the filter pack 10. U.S. Pat. No. 5,252,207, which is incorporated herein by reference in its entirety, discloses various examples of a wrap member and a wrapped filter element. The end caps, the core, the cage and the wrap member may be formed of either a conductive material, such as metal or a conductive polymer, or alternatively a nonconductive material, such as a nonconductive polymer.

Figure 2:
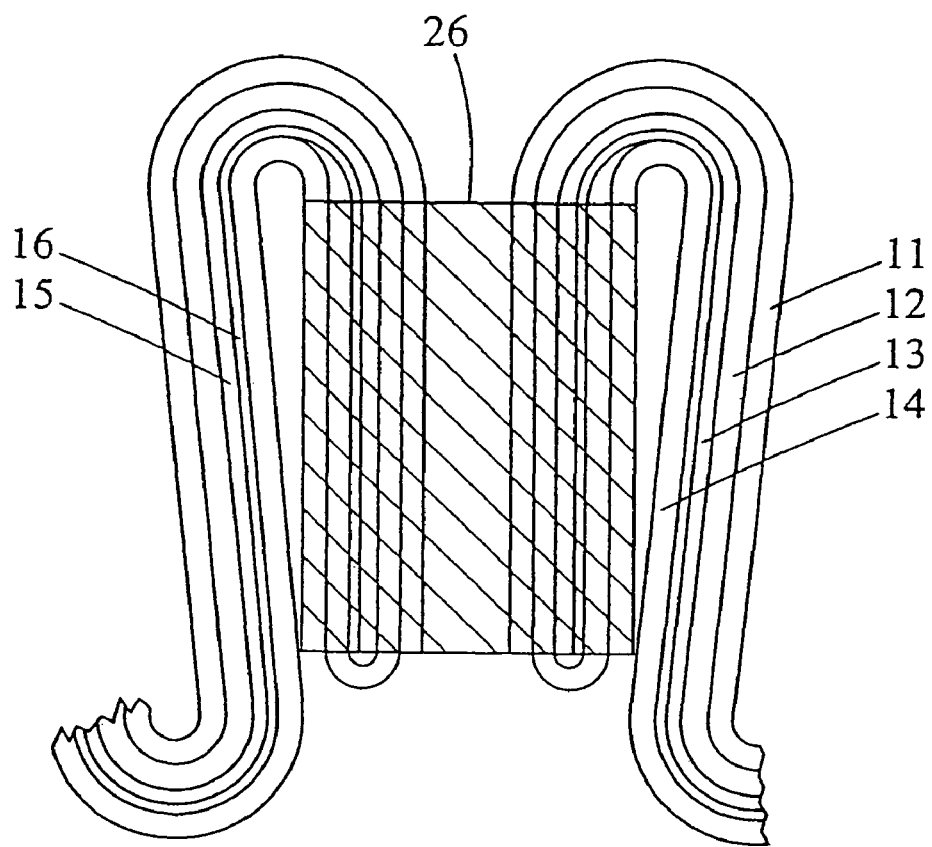
FIG. 2 is a sectional view of a side seam of a pleated fluid treatment pack.

The conductive layers, such as the conductive cushioning layer 12 and the conductive downstream drainage layer 14, may be electrically connected to each other in a variety of ways. For example, they may be electrically connected at the longitudinal side seam of the filter pack 10. In one embodiment, the edge(s) of at least one, or both, of the conductive layers, e.g., the conductive cushioning layer 12 and the conductive downstream drainage layer 14, extend beyond the edges of the other layers at the side seam and are brought into contact with the other conductive layer. For example, as shown in FIG. 2, the edge of the conductive cushioning layer 12 at the side seam may extend beyond the edges of the other layers and may be folded back into the composite in contact with the conductive downstream drainage layer 14. A sealant 26 may then be applied to the side seam, joining and sealing the side seam with the conductive cushioning layer 12 in electrical contact with the conductive downstream drainage layer 14.

Alternatively or additionally, the first and second conductive layers may be electrically coupled to each other in any other suitable manner. For example, the side seam sealant may be a conductive sealant, such as a conductive resin or a nonconductive resin having a conductive additive. The conductive sealant may be applied to the edges of the multi-layer composite in a manner which allows the conductive sealant to electrically connect the first and second conductive layers, e.g., the conductive cushioning layer 12 and the conductive downstream drainage layer 14, at the side seam. For example, the edges of the layers of the composite may be coextensive, and the conductive sealant may penetrate the porous layers and, thereby, join and seal them as well as electrically connect the first and second conductive layers. Alternatively, the side seal may be formed by fusion bonding, e.g., sonic welding, the edges of the layers, e.g., without the addition of a separate sealant. Fusion bonding effectively melts the edges of the layers resulting in a molten mass which may penetrate any intervening layers and, thereby join and seal them as well as electrically connect the first and second conductive layers. Where one or more of the layers of the composite material are formed from a conductive material, e.g., a conductive polymer, the melted edge of the conductive material serves as a sealant which can join and seal the layers of the composite as well as electrically connect the first and second conductive layers.

As another example, electrical connectors, such as conductive staples or conductive threads may be inserted into the edges of the composite material at the side seam. The conductive connectors may then mechanically join the layers of the multi-layer composite and electrically connect the first and second conductive layers at the side seam.

Further, the first and second conductive layers may be electrically connected through the intervening layers. For example, the filter matrix 15 may comprise conductive fibers including conductive filaments, or a mixture of conductive and nonconductive fibers and/or the substrate may comprise conductive material. The conductive cushioning layer 12 and the conductive downstream drainage layer 14 may then be electrically connected via the conductive fibers in the filter matrix 15 and the conductive substrate 16 across the entire area of the filter medium 13.

Alternatively or additionally, the first and second conductive layers may be electrically connected at the ends of the filter pack 10. For example, prior to bonding the end caps 22, 23 to the ends of the filter pack 10, the edges of one or both of the conductive layers at the ends of the filter pack 10 may be brought into contact with one another in a manner analogous to that previously described with respect to the edges at the side seam. Also, a conductive bonding agent, such as a conductive adhesive, may be used to bond the ends of the filter pack 10 to the end caps 22, 23, electrically connecting the edges of the conductive layers at the end caps 22, 23 in a manner analogous to that previously described with respect to the conductive sealant and the edges of the conductive layer at the side seam.

Further, the first and second conductive layers may be electrically coupled via a conductive end cap, e.g., a metal end cap or an end cap formed from a conductive polymer, including a nonconductive polymer having a conductive additive. For example, the edges of the conductive layers at the ends of the filter pack 10 may extend beyond the edges of the other layers of the composite and may be folded to lie flat against the end caps 22, 23. Also, the end caps 22, 23 may be joined to the ends of the filter pack 10, e.g., with a conductive adhesive. Or, the ends of the filter pack 10, with or without the edges of the conductive layers extending beyond the edges of the other layers, may be inserted into a molten portion of each end cap comprising a conductive polymer. The molten conductive polymer may then wick into the ends of the fluid treatment pack 10 and, once solidified, join and seal the ends of the filter pack 10 to the end caps 22, 23 as well as electrically connect the first and second conductive layers. With the first and second conductive layers electrically connected to each other, the filter medium is substantially surrounded with an electrical cage.

While the embodiment illustrated in FIGS. 1 and 2 has been described with reference to a fluid treatment pack 10 comprising a conductive cushioning layer 12 as a first conductive layer, e.g., an upstream conductive layer; a conductive drainage layer 14 as a second conductive layer, e.g., a downstream conductive layer; and a fibrous fluid treatment matrix 15 dry-laid or wet-laid on a porous substrate 16, the invention is not limited to this embodiment. For example, the upstream conductive layer may alternatively be a conductive upstream drainage layer or an additional conductive layer which does not function as either a drainage layer or a cushioning layer. Thus, the cushioning layer such as the conductive cushioning layer 12 may be eliminated entirely, and the fluid treatment pack may then comprise a conductive upstream drainage layer as the upstream conductive layer. Or the upstream conductive layer may be an additional layer which is conductive and which is positioned upstream of the fluid treatment medium with the upstream drainage layer or with both the upstream drainage layer and the upstream cushioning layer, either or both of which may be conductive or nonconductive.

Further, the downstream conductive layer may be a conductive downstream cushioning layer or the substrate may be conductive. The conductive substrate may be formed from a conductive material, such as metal, carbon or a conductive polymer or from a nonconductive material which is treated in any suitable manner to render the substrate conductive. For example, a conductive additive, such as metal, carbon or conductive polymeric particles or fibers, including filaments, may be included in the nonconductive material or the nonconductive material may be coated with a conductive coating such as metal or carbon coating. Or, the downstream conductive layer may be an additional layer which is conductive and which does not function as either a drainage layer or a cushioning layer. The additional layer may be disposed downstream of the fluid treatment medium with either the downstream cushioning layer or the downstream drainage layer or with both the downstream drainage layer and the downstream cushioning layer, either or both of which may be conductive or nonconductive.

Further, the fluid treatment medium need not comprise a fibrous matrix 12. Rather, the fluid treatment medium may comprise any of a wide variety of porous separation media. For example, the fluid treatment medium may comprise a supported or unsupported porous membrane, including a permeable or semipermeable polymeric membrane, such as a polymeric membrane formed from a nonconductive polymer. Alternatively, the fluid treatment medium may comprise a screen or an open-celled foam formed from a conductive or nonconductive material.

The fluid treatment element may be placed in the housing (not shown) of a fluid treatment assembly such as a filter assembly. In one preferred embodiment, the first and second conductive layers are electrically connected to each other. Further, the fluid treatment element may include an electrical contact, and the first and second conductive layers may be electrically coupled to the electrical contact. The electrical contact may preferably comprise any conductive portion of the fluid treatment element which is electrically coupled to the conductive layers and is arranged to contact a neutral potential, e.g., ground. Preferably, the electrical contact may be coupled to the neutral potential through the housing or any other conductive portion of the fluid treatment assembly. For example, the electrical contact may be a conductive portion of a conductive end cap that is electrically coupled to the conductive layers of the fluid treatment element, e.g., directly or via a conductive bonding agent, and is also electrically coupled to a conductive portion of the housing. Alternatively or additionally, the electrical contact may be a portion of a conductive core that is electrically coupled to the first and second conductive layers and is electrically connected to a conductive portion of the housing, e.g., a stool, a spider, or a tie rod of the housing. Alternatively or additionally, the electrical contact may comprise one or more additional conductive components such as a conductive wire, strap, spring or seal, e.g., a conductive O-ring or gasket that is electrically coupled to the conductive layers, e.g., directly or via a conductive bonding agent and/or a conductive end cap, and to a conductive portion of the housing.

While not being bound by any particular theory of operation, it is believed that as the fluid passes through the filter medium, in particular as a nonconductive or conductive fluid passes through the filter medium, electrical charge may be transferred between the filter medium and the fluid. The first and second conductive layers comprising the conductive upstream cushioning layer and the conductive downstream drainage layer are positioned in sufficiently close proximity to the fluid treatment medium to offset any electrical imbalance. Additionally, by coupling the electrical contact to a neutral potential and by electrically connecting the conductive layers to each other and the electrical contact, any charge build-up in the filter medium or fluid may be substantially inhibited.

In another preferred embodiment the first and second conductive layers are electrically connected and are also preferably isolated, e.g., insulated, from a neutral potential, such as ground. The first and second conductive layers may be isolated in any suitable manner. For example, the end caps as well as the upstream drainage layer and the downstream drainage layer may be fashioned from a nonconductive material, preventing any electrical connection between the first and second conductive layers and the housing and, thereby to ground. As another example, if the fluid treatment element includes a cage and a core, the cage and the core as well as the end caps may be fashioned from a nonconductive material, again preventing any electrical connection between the first and second conductive layers and ground. In yet another example, if the exterior and interior of the fluid treatment element are spaced from the conductive portions of the housing, then only the end caps may be fashioned from a nonconductive material. For any of these examples, if the ends of the fluid treatment pack are electrically insulated from the end caps, e.g., by a nonconductive adhesive, then the end caps may also be fashioned from a conductive material.

In a preferred mode of operation, a fluid to be treated is directed through the housing of the fluid treatment assembly and through the fluid treatment element, e.g., outside-in through the filter element 21 in a dead-end mode of filtration. The fluid is distributed by the upstream drainage layer 11 along the upstream surface of the conductive cushioning layer 12 and, hence, to the upstream surface of the fluid treatment medium 13, e.g., the upstream surface of the filter matrix 15. The fluid then passes through the fluid treatment medium 13, e.g., through the filter matrix 15, depositing undesirable substances such as particulates on or within the filter matrix 15. The fluid then passes through the conductive substrate 16 and drains along the downstream drainage layer 14 through the perforated core 24 to the interior of the fluid treatment pack 10.

While not being bound by any particular theory of operation, it is believed that as the fluid passes through the fluid treatment medium 13, in particular, as a conductive or nonconductive fluid passes through the filter medium, electrical charge may be transferred between the medium 13, e.g., the fluid treatment matrix 15, and the fluid. The first and second conductive layers 12, 14 are positioned in sufficiently close proximity to the fluid treatment matrix 15 to offset the electrical imbalance, e.g., to gather the electrical charge from the fluid treatment matrix 15 and return the charge to the fluid and/or to prevent the charge from accumulating in the fluid treatment matrix 15. For example, one or both of the first and second conductive layers may be immediately adjacent to and in face-to-face contact with the fluid treatment medium. This configuration is preferred because it enhances the electrical coupling between the fluid treatment medium and the conductive layer(s) over the entire surface area of the fluid treatment medium. Alternatively, one or more nonconductive layers may be interposed between the fluid treatment medium and each of the first and second conductive layers as long as the first and/or second conductive layers are sufficiently close to the fluid treatment medium to inhibit electrical imbalance and/or charge build-up through the intervening layer. Electrical imbalance and/or charge build-up in the fluid treatment medium and/or the fluid is thus substantially reduced. The porosity of both conductive layers or at least the downstream conductive layer is preferably arranged to provide sufficient contact between the fluid and the conductive layer to facilitate offsetting the electrical imbalance as the fluid flows through the conductive layers. For example, the nominal pore size one or both of the conductive layers may be less than about 500µ or less than about 250µ or less than about 100µ. However, the pore size of each conductive layer is preferably large enough that no substantial pressure drop occurs as the fluid flows through the conductive layer. For example, the pressure drop through the downstream conductive layer is preferably no greater than about 5% or preferably no greater than about 1% of the pressure drop through the fluid treatment pack.

While the embodiment illustrated in FIGS. 1 and 2 has been described with reference to a generally cylindrical, pleated fluid treatment element, such as a filter element arranged for dead-end filtration, the invention is not limited to this embodiment. For example, the fluid treatment element may have a box-like configuration and/or the fluid treatment pack may include micro-pleats and macro-pleats. Several examples of a fluid treatment element having a box-like configuration and micro- and macro-pleats are disclosed in U.S. Pat. No. 5,098,767, which is incorporated by reference in its entirety. As another example, the fluid treatment pack may be spirally-wound rather than pleated, and a fluid treatment element including pleated or spirally-wound pack may be arranged for cross flow separation, e.g., cross flow filtration. Several examples of a fluid treatment element including a pleated or spirally-wound fluid treatment pack being arranged for cross flow separation and/or mass transfer are disclosed in International Publication No. WO 00-13767, which is incorporated by reference in its entirety.

In accordance with a second aspect of the invention, a fluid treatment pack comprises a pleated multi-layer composite having interior roots and exterior crests. The multi-layer composite includes a porous fluid treatment medium and at least one conductive layer electrically coupled to the porous medium to transfer charge between porous medium and the conductive layer. The fluid treatment pack may be removably mountable to a conductive perforated core and the conductive layer may comprise the interior surface of the fluid treatment pack including the interior surface at the roots. Alternatively or additionally, the fluid treatment pack may be removably mountable to a conductive perforated cage and the conductive layer may comprise the exterior surface of the fluid treatment pack including the exterior surface at the crests. The pleats may be respectively dimensioned to enhance the electrical connection between the conductive layer and the core and/or the cage, e.g., by allowing the roots and/or the crests to press against the core and/or cage. As fluid flows through the fluid treatment pack, the fluid may be treated, e.g., undesirable substances, such as particulates, may be removed from the fluid. With the porous medium electrically coupled to the conductive layer and with the conductive layer electrically coupled to the core and/or cage, a substantial portion of any electrical charge in the porous fluid treatment medium and/or fluid may be dissipated via the conductive layer and the conductive core and/or cage to a neutral potential, such as ground.

In one preferred embodiment, a fluid treatment pack comprises a multi-layer composite removably mountable to a conductive perforated core. The multi-layer composite preferably includes a non-conductive upstream drainage layer, an upstream conductive cushioning layer, a porous filter matrix bonded to a conductive substrate, and a conductive downstream drainage layer. The conductive layers are preferably electrically connected via a longitudinal side seam, for example by fusion bonding the conductive layers at the side seam. Further, the multi-layer composite is preferably pleated and the pleats are dimensioned to allow the roots to press against the core and provide an electrical connection at the roots which comprises contact between the conductive downstream drainage layer and the core.

Figure 3:
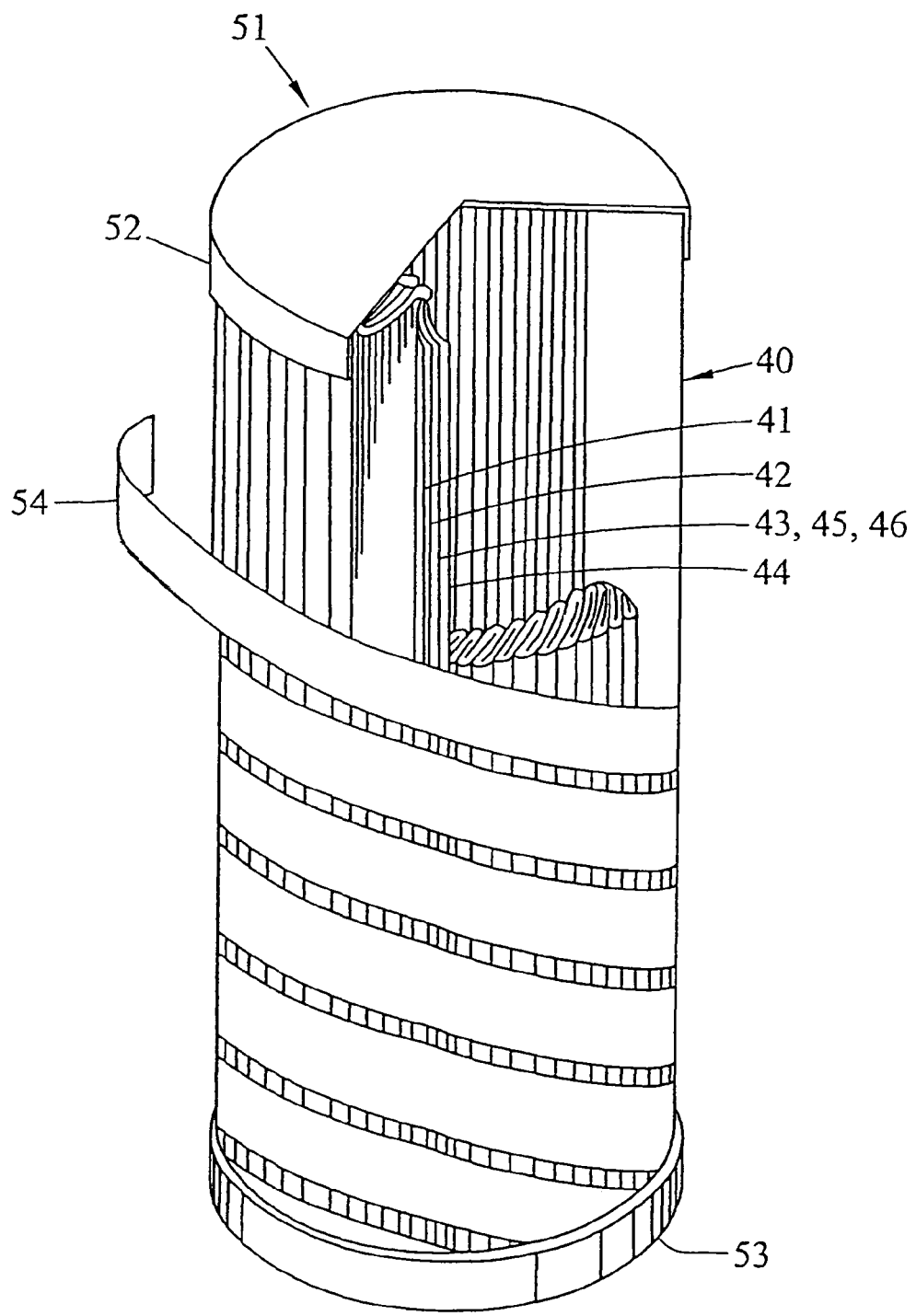
FIG. 3 is a partially cutaway oblique view of another fluid treatment element.

As shown in FIG. 3, one example of a fluid treatment pack, e.g., a filter pack 40, embodying the present invention comprises a pleated, multi-layer composite having a hollow, generally cylindrical configuration. The multi-layer composite may comprise a porous upstream drainage layer 41, a porous conductive cushioning layer 42, a fluid treatment medium, such as a permeable or semipermeable filter medium 43, and a porous conductive downstream drainage layer 44, which includes the interior surface of the fluid treatment pack 40. The fluid treatment medium 43 may comprise a fluid treatment matrix 45, e.g., a fibrous, including filamentous, layer, and the fluid treatment matrix 45 may be dry-laid or wet-laid on and bonded to a porous conductive substrate 46. The porous conductive substrate 46 is preferably disposed immediately downstream of and in intimate bonded contact with the fluid treatment matrix 45, and the conductive downstream drainage layer 46, which may comprise the conductive layer in this embodiment of this second aspect of the invention, is disposed immediately downstream of and in face-to-face contact with the conductive substrate 46. Similarly, the conductive cushioning layer 42 is disposed immediately upstream of and in face-to-face contact with the fluid treatment matrix 45, and the upstream drainage layer 41, which may also comprise the conductive layer in this embodiment of the invention, is disposed immediately upstream of and in face-to-face contact with the conductive cushioning layer 42.

Many of the properties of the drainage layers, the cushioning layers, and the fluid treatment media may be similar to those previously described with the respect to the embodiment shown in FIG. 1. However, the upstream and downstream drainage layers in the embodiment shown in FIG. 3 are preferably fashioned from any of a variety of suitable conductive materials to provide a conductive interior surface of the fluid treatment pack, e.g., at the roots of the pleats, and a conductive exterior surface, e.g., at the crests of the pleats. For example, the conductive drainage layers may be fashioned from a conductive material, such as a metal, carbon, or a conductive polymer, or from a nonconductive material, such as glass fiber or a nonconductive polymer, which is treated in any suitable manner to render the downstream drainage layer conductive. A conductive additive, such as metal, carbon, or a conductive polymeric particles or fibers, including filaments, may be included with the nonconductive material or the nonconductive material may be coated with a conductive coating, such as a metal or carbon coating. In the embodiment illustrated in FIG. 3, the upstream and downstream drainage layers 41, 44 preferably comprise a conductive, carbon-coated polyamide (e.g., nylon) extruded mesh; the conductive cushioning layer 42 and the conductive substrate 46 preferably comprise a conductive carbon-coated polyester nonwoven sheet; and the fluid treatment matrix 45 preferably comprises a filter matrix of wet-laid, resin-bonded glass fibers.

The multi-layer composite may be pleated in any suitable manner and formed into the generally cylindrical fluid treatment pack, such as a filter pack 40, for example, by sealing a longitudinal side seam. The pleats may extend generally radially and have a height substantially equal to (D−d)/2, or the pleats may extend non-radially and have a height greater than (D−d)/2. The fluid treatment pack 40 may be incorporated in a fluid treatment element 51 in a variety of ways, as previously described with respect to the embodiment of FIG. 1. For example, the ends of the fluid treatment pack 40 may be joined to opposite open or blind end caps 52, 53, and the end caps may be formed from a conductive material or a nonconductive material. A wrap member 54 may be disposed around the exterior of the fluid treatment pack 40. In the illustrated embodiment, the end caps 52, 53, the wrap member 54 and any adhesive bonding material or sealant are all preferably conductive.

In accordance with this second aspect of the invention, the fluid treatment element preferably does not include at least one of a core and a cage. Rather, the core and/or the cage may be mounted and electrically connected to the housing of a fluid treatment assembly, and the housing may, in turn, be electrically connected to a neutral potential such as ground. The fluid treatment element is preferably removably mounted to the core and/or the cage. In the illustrated embodiment, the fluid treatment element 51 may be removably mountable to a core, the core being attached to the housing of a fluid treatment assembly (not shown), which, in turn, is connected to ground. U.S. Pat. No. 5,476,585, which is incorporated by reference in its entirety, discloses various examples of coreless fluid treatment elements. However, in embodiments of this second aspect of the invention, the pleats are preferably dimensioned to contact the core.

The conductive layer, such as the conductive upstream drainage layer 41 and/or the conductive downstream drainage layer 44, and the fluid treatment medium, such as the fibrous fluid treatment matrix 45, may be electrically coupled to each other in any suitable manner. For example, in the embodiment of FIG. 3, the fibrous filter matrix 45, whether conductive or nonconductive, is in sufficiently close proximity to, preferably immediately adjacent to and in face-to-face contact with, the conductive cushioning layer 42 and the conductive substrate 46 to transfer electrical charge between them across the entire area of the filter medium. The conductive cushioning layer 42 and/or the conductive substrate 46, in turn, may each be electrically connected to the conductive upstream drainage layer 41 and/or the conductive downstream drainage layer 44, as well as the conductive cushioning layer 42 and the upstream drainage layer, in a variety of ways, as previously described with respect to the embodiment shown in FIG. 1. For example, the conductive substrate 46 and the conductive downstream drainage layer 44 may be immediately adjacent one another and in intimate electrical contact with one another over the entire surface area of the conductive downstream drainage layer 44. Alternately, or additionally, the conductive layer, e.g., the conductive upstream and/or downstream drainage layer, may be electrically connected to one or more of the other conductive layers, including, for example, a conductive fluid treatment medium or fluid treatment matrix, a conductive substrate, a conductive cushioning layer, and/or a conductive drainage layer, at the side seam, at the ends of the fluid treatment pack, via conductive end caps, or via conductive intervening layers, all as previously described with respect to the previous embodiments.

While the embodiment illustrated in FIG. 3 has been described with reference to a coreless fluid treatment pack such as a filter pack 40 comprising a fibrous filter matrix 45 dry-laid or wet-laid on a conductive substrate 46 and conductive upstream and/or downstream drainage layers 41, 44 as the conductive layer(s) electrically coupled to the fibrous matrix 45, the invention is not limited to this embodiment. For example, one or more conductive or non-conductive layers may be added to the fluid treatment pack. A conductive layer which functions neither as a cushioning layer nor a drainage layer may be added to the fluid treatment pack upstream or downstream of the fluid treatment medium. A conductive or nonconductive downstream cushioning layer may be disposed between the conductive substrate and the conductive downstream drainage layer, and the conductive downstream drainage layer may be connected to the conductive upstream cushioning layer at the side seam or at the ends of the fluid treatment pack and may be connected to the conductive substrate at the side seam, at the ends of the pack, or via face-to-face contact through the intervening downstream cushioning layer. As another example, one or more of the layers may be fashioned from non-conductive material or may be eliminated entirely. The upstream cushioning layer or the substrate may be non-conductive or eliminated entirely, or both may be non-conductive or eliminated and the fluid treatment medium may be fashioned from a conductive material and electrically connected to the conductive downstream drainage layer, e.g., at the side seam or the ends of the pack. The conductive downstream drainage layer may be eliminated and the conductive substrate may comprise the conductive layer including the interior surface of the pack and electrically coupled to the fibrous matrix.

Further, the fluid treatment element may include a core, either conductive or nonconductive, but may be cageless, the cage being connected to the housing of the fluid treatment assembly and electrically connected via the housing to a neutral potential such as ground. The fluid treatment pack may then include a conductive layer, such as a conductive upstream drainage layer, having a conductive exterior surface which connects to the cage directly or indirectly through a conductive wrap member. The conductive layer, e.g., the conductive upstream drainage layer, may be electrically coupled to the porous fluid treatment medium or matrix in any suitable manner, e.g., by being immediately adjacent to and in face-to-face contact with the porous medium or matrix, via conductive intervening layers, such as a conductive upstream cushioning layer, or via a connection at the side seam or the ends of the fluid treatment pack to the cushioning layers, the porous medium or matrix, the substrate, or the downstream drainage layer.

Further, the porous fluid treatment medium need not comprise a fibrous matrix. Rather, the porous medium may comprise any of a wide variety of porous separation media. For example, the porous medium may comprise a supported or unsupported porous membrane, including a permeable or semipermeable polymeric membrane, such as a polymeric membrane formed from a nonconductive polymer. Alternatively, the porous medium may comprise a screen or an open-celled foam formed from a conductive or nonconductive material.

In a preferred mode of operation, a fluid treatment element such as a filter element 51 is mounted over a conductive perforated core of the housing of a fluid treatment assembly (not shown) through an open end cap. The pleats of the fluid treatment pack 40 are dimensioned to provide an electrical connection or contact between the interior surface of the conductive layer, e.g., the conductive downstream drainage layer 44, at the roots of the pleats and the conductive core. Alternatively or additionally, the fluid treatment element may be mounted within a conductive cage and the pleats of the fluid treatment pack may be dimensioned to provide an electrical connection or contact between the exterior surface of the conductive layer, e.g., a conductive upstream drainage layer, at the crests of the pleats and the conductive cage, either directly or indirectly through a conductive wrap. A fluid to be treated, e.g., filtered, is directed through the housing of the fluid treatment assembly and preferably outside-in but alternatively inside-out through the fluid treatment element, e.g., through the filter element 51 in a dead-end mode of filtration. The fluid is distributed by the upstream drainage layer 41 along the upstream surface of the conductive cushioning layer 42 and, hence, to the upstream surface of the fluid treatment medium 43, e.g., the upstream surface of fibrous matrix 45. The fluid then passes through the fluid treatment medium 43, e.g., through the fibrous filter matrix 45, depositing undesirable substances such as particulates on or within the filter matrix 45. The fluid then passes through the conductive substrate 46 and drains along the conductive downstream drainage layer 44 and through the perforated core to the interior of the core, from which the fluid exits the housing.

While not being bound by any particular theory of operation, it is believed that as the fluid passes through the fluid treatment medium, in particular as a conductive or non-conductive fluid passes through the fluid treatment medium, such as the fluid treatment matrix 45, electrical charge may be transferred between the fluid treatment medium, e.g., the fibrous matrix 45, and the fluid. By providing electrical contact between the grounded core or cage and the interior or exterior surface of the conductive layer and by electrically coupling the conductive layer to the fluid treatment medium, the electrical imbalance is substantially offset and charge buildup in either the fluid treatment medium or the fluid is substantially inhibited. Once the fluid treatment element becomes sufficiently fouled, it may be removed from the core or cage and a cleaned or new fluid treatment element may be remounted to the core or cage.

In a preferred embodiment of this second aspect of the invention, the only electrical connection between the neutral potential such as ground and the fluid treatment pack is via the electrical contact between the interior surface of the conductive layer(s) and the core and/or the exterior surface of the conductive layer(s) and the cage. The surface area of the contact between the interior and/or exterior surface of the conductive layer(s) at the roots and/or crests of the pleats and the core and/or cage is very large and, therefore, provides a highly effective electrical contact. The end caps may thus be formed from a non-conductive material such as a non-conductive polymeric material. No additional grounding connections, such as grounding straps, grounding springs, or conductive O-ring seals need be provided, simplifying both the construction of the fluid treatment element and the retrofitting of the existing fluid treatment assemblies with fluid treatment elements embodying this second aspect of the invention. Alternatively, the fluid treatment element may be electrically coupled to ground via any of these various other grounding connections in addition to the electrical connection between the conductive layer(s) at the roots and/or crests of the pleats and the core and/or cage.

While the embodiment illustrated in FIG. 3 has been described with reference to a generally cylindrical, pleated fluid treatment element such as a pleated filter element arranged for dead-end filtration, the invention is not limited to this embodiment. Many of the alternatives suggested with respect to the embodiment shown in FIGS. 1 and 2 are applicable to the embodiment shown in FIG. 3. For example, the fluid treatment element may include a pleated pack arranged for cross-flow separation or mass transfer.

In accordance with a third aspect of the invention, a fluid treatment element comprises a fluid treatment pack which includes a fibrous matrix supported by a conductive substrate. Preferably, the fibrous matrix is dry laid or wet laid on and bonded to the conductive substrate. The fluid treatment element further comprises an electrical contact which is electrically coupled to the conductive substrate. The electrical contact of the fluid treatment element is also arranged to be connected to a conductive portion of a fluid treatment assembly, e.g., the housing of the assembly, which, in turn, is connected to a neutral potential, such as ground. As the fluid flows through the fluid treatment assembly and, hence, through the fluid treatment element, the fluid is treated by the fibrous matrix. In addition, electrical charge may be transferred between the fluid and the fibrous matrix. Because the conductive substrate is bonded to the fibrous matrix, it is closely electrically coupled to the fibrous matrix. Consequently, a substantial portion of any charge imbalance which may arise in the fibrous matrix and/or the fluid can be substantially offset by the connection to the neutral potential via a conductive path including the conductive substrate and the electrical contact of the fluid treatment element and the conductive portion of the fluid treatment assembly.

Figure 4:
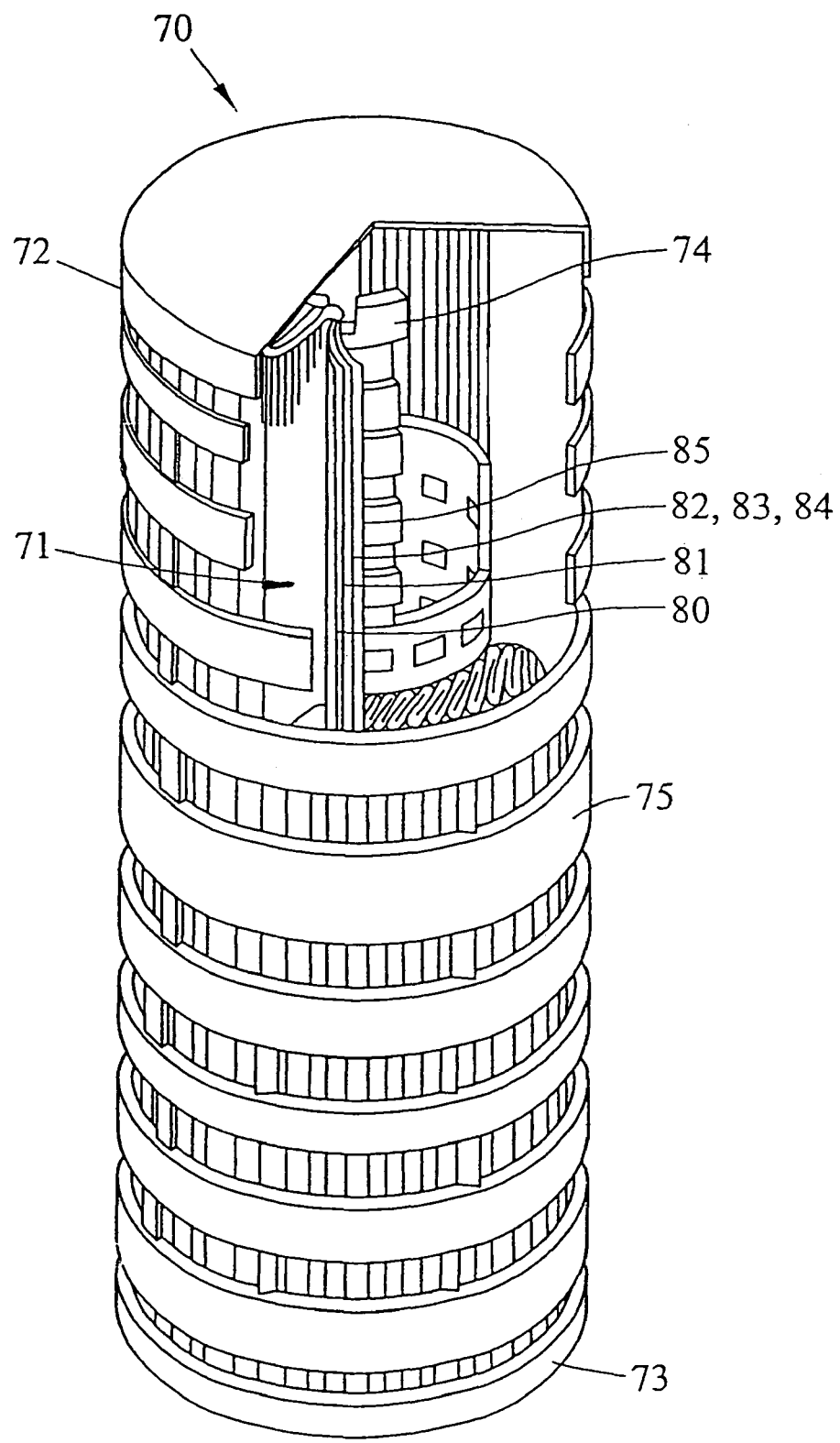
FIG. 4 is a partially cutaway oblique view of another fluid treatment element.

As shown in FIG. 4, one example of a fluid treatment element, e.g., a filter element 70, embodying the present invention comprises a fluid treatment pack, such as a filter pack 71, bonded to open and blind end caps 72, 73 at opposite ends of the filter pack 71. The pack 71 is supported by a core 74 and a cage 75 along the interior and exterior surfaces of the pack 71. The core 74 and the cage 75 are preferably permanently connected to the fluid treatment element 70, although the fluid treatment element may be coreless or cageless. In the illustrated embodiment, the end caps 72, 73, the core 74, the cage 75 and any adhesive bonding material or sealant are all preferably conductive.

The fluid treatment pack, e.g., the filter pack 71, may comprise a pleated, multi-layer composite having a hollow, generally cylindrical configuration. The multi-layer composite may be pleated in any suitable manner and formed into the generally cylindrical pack, for example, by sealing a longitudinal side seam. The pleats may extend generally radially and have a height substantially equal to (D−d)/2, or the pleats may extend nonradially and have a height greater than (D−d)/2.

The pleated multi-layer composite may comprise a porous conductive upstream drainage layer 80, a porous conductive upstream cushioning layer 81, fluid treatment medium, such as a filter medium 82, including a fibrous matrix, such as a fibrous filter matrix 83, dry-laid or wet-laid on and bonded to a porous conductive substrate 84, and a porous conductive downstream drainage layer. Many of the properties of the drainage layers and the cushioning layers may be similar to those previously described with respect to the embodiments shown in FIGS. 1-3.

However, the fluid treatment medium, e.g., the filter medium 82, may comprise a fibrous fluid treatment matrix 83 supported by the conductive substrate 84. Preferably the fibrous fluid treatment matrix 83 is laid on and bonded to the conductive substrate 84. The fibrous matrix 83 may be fashioned from a variety of fibrous, including filamentous, materials and may be formed from only nonconductive materials, from conductive materials, or from a mixture of conductive and nonconductive materials. The conductive substrate 84 may be fashioned from a mesh, screen, netting, or woven or non-woven sheet and may be formed from a conductive material or a nonconductive material which is treated in any suitable manner to render the substrate conductive. The fibrous matrix 83 is preferably laid on the conductive substrate 84, e.g., dry-laid or wet-laid, and is bonded to the conductive substrate 84, e.g., chemically bonded, solvent bonded, thermally bonded, and/or mechanically bonded by mechanically entanglement of the fibers of the fibrous matrix 83 and the substrate 84, thereby forming a composite fluid treatment medium 82. Many preferred composite media comprising a filter matrix and a conductive substrate are disclosed, for example, in U.S. Provisional Patent Application No. 60/166,990 of Joseph Adiletta, Leonard Bensch, Kenneth Williamson, and Ronald Hundley, entitled Porous Media For Dissipating Electrical Charge and the PCT application of Joseph Adiletta, Leonard Bensch, Kenneth Williamson, and Ronald Hundley, entitled Porous Media For Dissipating Electrical Charge filed concurrently with this application, which are incorporated by reference in their entirety. In the illustrated embodiment, the conductive substrate 84 preferably comprises a conductive non-woven sheet, such as a carbon coated polyester non-woven sheet, and the fibrous matrix 83 preferably comprises a wet-laid, resin-bonded glass fiber layer. The conductive substrate and the electrical contact may be electrically coupled in a wide variety of ways, including, any of the previously described electrical connections at the side seam, at the ends of the fluid treatment pack, or via intervening conductive layers.

The electrical contact preferably comprises any conductive portion of the fluid treatment element which is electrically coupled to the conductive layer and is arranged to contact a conductive portion of the fluid treatment assembly. For example, the electrical contact may be any conductive portion of the fluid treatment pack 71 (e.g., the interior surface or the exterior surface), the end caps 72, 73, the core 74, and the cage 75 which is electrically connected to the conductive substrate 84 and is arranged to contact a conductive portion of the fluid treatment assembly. In particular, the electrical contact 86 may preferably comprise a conductive portion of the open end cap 73 or the core 74 which may be mounted to and electrically contact a conductive fitting of the housing (not shown) which, in turn, is connected to a neutral potential such as ground.

While the embodiment illustrated in FIG. 4 has been described with reference to a fluid treatment element, such as a filter element 70, which has a core 74 and a cage 75 and which includes several conductive components, the invention is not limited to this embodiment. For example, one or more conductive or nonconductive layers, such as a conductive or nonconductive downstream cushioning layer or a conductive layer which functions neither as a cushioning layer nor a drainage layer, may be added to the fluid treatment pack. As another example, one or more or all of the drainage layers, cushioning layers, and additional layers may be fashioned from a nonconductive material. The conductive substrate may, for example, then be connected to the electrical contact via a conductive end cap. As still another example, one or more of the cushioning layers, the drainage layers, or the additional layers, such as the upstream cushioning layer or the downstream drainage layer may be eliminated entirely.

Further, the fluid treatment element may be cageless and/or coreless. The electrical contact may then comprise the exterior surface and/or the interior surface of the fluid treatment pack which contacts the cage and/or the core and is thereby electrically coupled to a neutral potential such as ground. Or the cage, the core, or both the cage and core may be fashioned from a nonconductive material. The electrical contact may then comprise a surface of a conductive end cap which is arranged to electrically contact a conductive portion of the housing. Or the end caps or the adhesive connecting the ends of the fluid treatment element to the end caps may be nonconductive. The electrical contact may then comprise a surface of a conductive cage or core which is electrically coupled to the conductive substrate in any suitable manner. The conductive cage or core may then be electrically connected to a conductive portion of the fluid treatment assembly in a wide variety of ways, e.g., via a conductive strap or wire or spring connecting the cage or the core to the housing.

In a preferred mode of operation, a fluid treatment element, such as a filter element 70, may be mounted to a fitting of the housing of a fluid treatment assembly, such as a filter assembly (not shown), at the open end cap 73. The surface of the end cap and/or the core which contacts the fitting may serve as the electrical contact which is coupled to a neutral potential such as ground through the housing. A fluid to be treated, e.g., filtered, is directed through the housing of the fluid treatment assembly and preferably outside-in, but alternatively inside-out, through the fluid treatment element, e.g., through a filter element 70 in a dead-end mode of filtration. The fluid passes through the perforated cage 75 and is distributed by the upstream drainage layer 80 along the upstream surface of the cushioning layer 81 and, hence, to the upstream surface of the fluid treatment medium 82 or the fibrous matrix 83. The fluid then passes through the fibrous matrix 83, where the fluid is treated, e.g., where undesirable substances such as particulates are deposited on or within the fibrous matrix 83. The fluid then passes through the conductive substrate 84, drains along the downstream layer 85, and passes the perforated core 74 to the interior of the core 74, from which the fluid exits the housing through the open end cap 73.

While not being bound to any particular theory of operation, it is believed that as the fluid passes the fibrous matrix 83, in particular as a conductive or nonconductive fluid passes through the fibrous matrix, electrical charge may be transferred between the fibrous matrix and the fluid. By coupling the electrical contact 86 to the grounded fitting and by electrically connecting the conductive substrate 84 to the electrical contact 86, e.g., via a conductive connection between the conductive substrate 84 and the conductive end cap 73, any electrical imbalance may be substantially offset and any charge build up in either the fibrous matrix 83 or the fluid may be substantially inhibited. Because the fibrous matrix is laid on and bonded to the conductive substrate, the conductive substrate is particularly well coupled electrically to the fibrous matrix, significantly enhancing the ability of the conductive substrate to transfer charges between the fibrous matrix and the electrical contact and hence the neutral potential. Consequently, fluid treatment elements embodying this third aspect of the invention are very effective at inhibiting charge build up in the fibrous matrix and/or the fluid.

While the embodiment illustrated in FIG. 4 has been described with reference to a generally cylindrical, fluid treatment element, such as a pleated filter element arranged for dead-end filtration, the invention is not limited to this embodiment. Many of the alternatives suggested with respect to the embodiments shown in FIGS. 1, 2, and 3 are applicable to this embodiment. For example, the fluid treatment element may include a pleated pack and/or may be arranged for cross flow separation or mass transfer, the fluid treatment element may include a fluid treatment pack which is spirally-wound rather than pleated, and/or the fluid treatment element may have a box-like configuration.

Another example of a fluid treatment element is a coalescer element which accretes one phase of a fluid, e.g., a liquid discontinuous phase, in another phase of the fluid, e.g., a liquid or gas continuous phase, allowing the discontinuous phase to be separated from the continuous phase. International Publications No. WO 98/14257 and No. WO 97/38781 and U.S. Pat. No. 5,443,724 and No. 5,480,547 disclose a variety of coalescer elements and coalescer assemblies, as well separator elements and separator assemblies, and are incorporated herein by reference.

In accordance with another aspect of the invention, a fluid treatment element such as a coalescer element comprises first and second conductive layers and a porous fluid treatment medium such as a coalescer medium. The first and second conductive layers are preferably electrically connected to each other and the coalescer medium is disposed between them. As a fluid flows through the coalescer element, in particular, the coalescer medium, a discontinuous phase of the fluid is accreted on the surfaces of the coalescer medium. In addition, an electrical charge may be transferred between the fluid and the coalescer medium. The first and second conductive layers are positioned in sufficient proximity to the coalescer medium to offset any electrical imbalance, for example, by dissipating the charge and/or collecting the charge in the coalescer medium and returning the charge to the fluid as it flows through the conductive layers or by preventing the charge from accumulating in the coalescer medium. Thus, even if the coalescer element is electrically isolated from the ambient environment, e.g., electrically isolated from a common or neutral potential such as ground, the first and/or second conductive layers may offset all or a substantial portion of the electrical imbalance which may arise in the coalescer medium. The coalescer medium is thus substantively surrounded by an electrical cage which offsets, e.g., reduces, inhibits, or prevents, the electrical imbalance.

Figure 5:
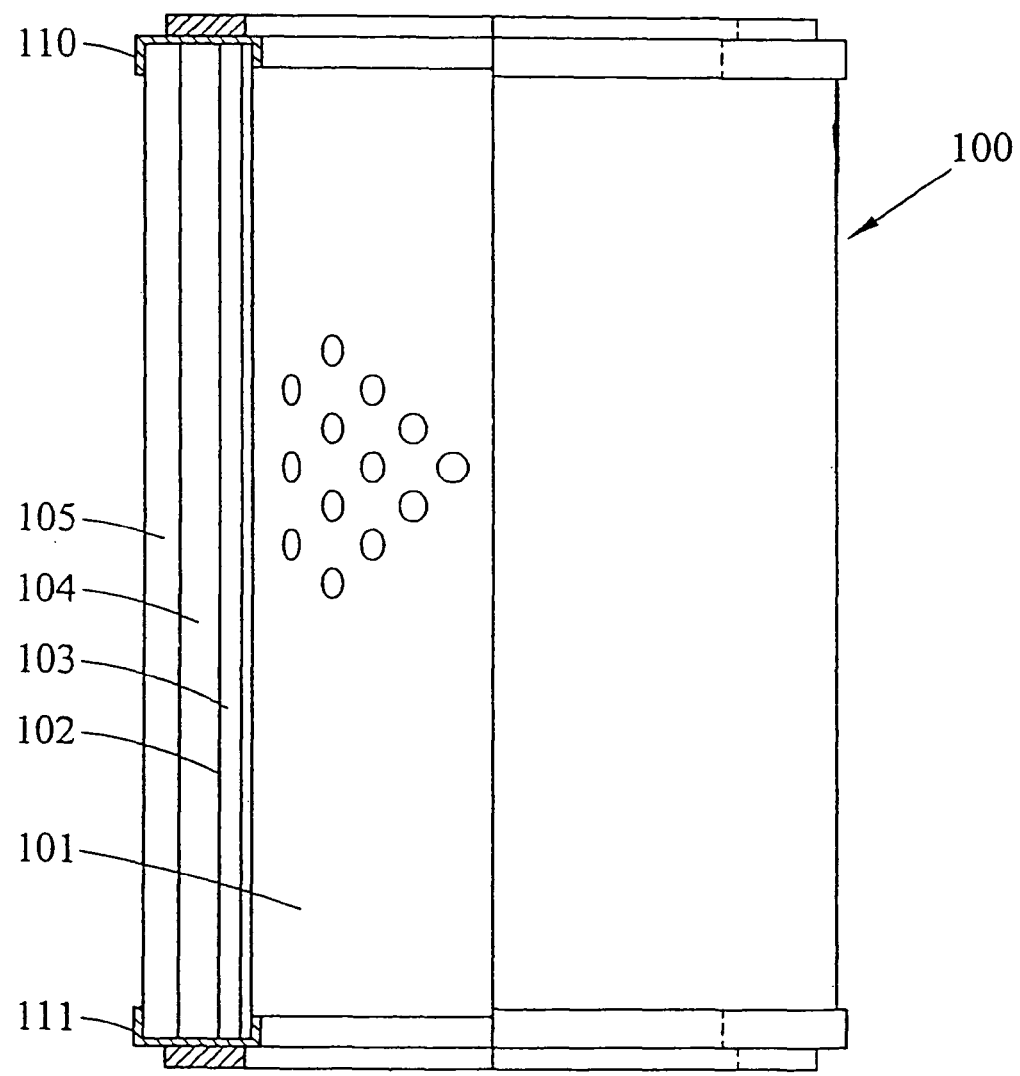
FIG. 5 is a partially cutaway elevation view of another fluid treatment element.

As shown in FIG. 5, one example of a fluid treatment element such as a coalescer element 100 embodying the present invention has a hollow generally cylindrical configuration, and fluid flows outside-in or, preferably, inside-out through the coalescer element 100. The coalescer element 100 may include a perforated conductive core 101 and a coalescer medium 102 disposed around the core 101. The coalescer medium 102 preferably includes a packing material or coalescing matrix 103 having a smaller nominal pore size and a final classifier 104 having a larger nominal pore size downstream of the coalescing matrix 103. The coalescer medium 102 thus has a graded nominal pore structure where an upstream region has a smaller nominal pore size than the nominal pore size of a downstream region. In the illustrated embodiment, a fluid preferably flows inside-out through the coalescer element 100 and the coalescing matrix 103 is disposed co-axially between the core 101 and the final classifier 104. A conductive wrap structure 105 having openings, such as the wrap structure disclosed in International Publication No. WO 98/14257, is preferably disposed around the final classifier 104. Each of these components is preferably disposed between opposite end caps 110, 111, one or both of which may be an opened end cap. The conductive core 101 and the conductive wrap structure 105 may comprise the first and second conductive layers with the coalescer medium 102 including the coalescing matrix 103 disposed between them.

The core 101 may be fashioned from any suitably conductive material, such as a metal or a conductive polymer, or any non-conductive material that has been rendered conductive in any suitable manner and preferably has a perforated hollow configuration. For example, the core 101 preferably comprises a hollow, perforated, stainless steel tube, where fluid flows between the interior of the hollow tube and the exterior of the hollow tube via the perforations or holes. Alternatively, the core may have a solid configuration or a hollow configuration without holes and flow channels may be disposed along the outer surface of the core.

The coalescer matrix 103 may be fashioned from a wide variety of materials having suitable coalescing characteristics, including a fibrous mass, fibrous mats, woven or nonwoven sheets or screens, or porous membranes. The coalescing matrix 103 may be a single layer structure or a multi-layer structure and may have a uniform pore structure or a graded pore structure where, for example, an upstream region adjacent to the core 101 has a larger pore size than a downstream region in order to more evenly distribute fluid flow from the core 101 into the coalescing matrix 103. A graded pore structure may also be affected with multiple layers where, for example, each layer has a uniform pore structure and an upstream layer has a larger pore size than a downstream layer. However, the nominal pore size of the coalescing matrix 103 is preferably in the range from about $0.2\mu$ or less to about $20\mu$ or more, e.g., from about $0.2\mu$ to about $5\mu$. Further, while the coalescing matrix 103 may be pleated, it is preferably arranged in a non-pleated configuration, e.g., a hollow cylindrical configuration.

The coalescing matrix 103 may be formed from a material or may be surface modified in any suitable manner, e.g., coated with a material, which facilitates the formation of droplets of the discontinuous phase and the accretion of these small droplets into larger droplets as the discontinuous phase contacts the coalescing matrix 103. The desired physical and chemical characteristics, e.g., the critical surface energy, of the coalescing matrix 103 which promotes the formation and accretion of droplets of the discontinuous phase may vary in accordance with the nature of the discontinuous phase and/or the continuous phase. Thus, the coalescing matrix 103, as well as the final classifier 104, may comprise a metallic material, a polymeric material, a glass fiber material, or any other suitable material or mixture of materials and may be treated to modify its critical surface energy, e.g., by application of a suitable surface treatment, such a silicone or fluoropolymer surface treatment available from 3M Company or from Pall Corporation.

One embodiment of the coalescing matrix 103 may comprise a matrix of non-conductive polymeric fibers, e.g., polyester fibers, blown onto the perforated metal core 101, as described in International Publication No. WO 96/03194. The polymeric fibers of the coalescing matrix 103 may be treated to modify the critical surface energy by application of a fluoropolymer surface treatment.

The final classifier 104 is disposed co-axially downstream of and, preferably, immediately adjacent to the coalescing matrix 103 and preferably has a nominal pore size no less than and preferably greater than that of the coalescing matrix 103. For example, the nominal pore size of the final classifier 104 is preferably in the range from about 50µ to about 1000µ, e.g., from about 50µ to about 300µ. The final classifier 104 may be fashioned from any suitable material or may be surface modified in any suitable manner, e.g., by application of a fluoropolymer surface treatment, which facilitates drainage of the droplets of the discontinuous phase away from the coalescing medium 103 and/or which further facilitates the formation and the accretion of droplets of the discontinuous phase. The final classifier 104 is also preferably formed as a cylindrical mass or sheet of polymeric fibers, e.g., polyester fibers. In a preferred embodiment, the final classifier 104 comprises a plurality of sheets of a fibrous polyester non-woven, e.g., about five sheets. The upstream sheet(s) have a smaller nominal pore size than the downstream sheet(s).

The conductive wrap structure 105 is disposed co-axially downstream of the final classifier 104, preferably immediately downstream. The wrap structure 105 preferably comprises a porous material having holes extending through the porous material. The holes are preferably arranged uniformly along the porous material and may have a dimension, such as a diameter, of about D, where D is any rational number in the range from about 20 thousandths of an inch or less to about 250 thousandths of an inch or more. The porous material may be treated to inhibit passage of the discontinuous phase but allow passage of the continuous phase. Accordingly, the droplets of the discontinuous phase may be constrained to flow primarily through the holes of the wrap structure 105 while the continuous phase may pass through the pores of the porous material of the wrap structure 105.

The conductive wrap structure 105 may be formed from a conductive material, such as a metal, carbon, or a conductive polymer, or from a non-conductive material, such as glass fiber or a non-conductive polymer, e.g., a non-conductive polymeric fiber, which is treated to render the wrap structure conductive. For example, the non-conductive material may be treated in any manner similar to those previously mentioned with respect to the filter elements, including providing a conductive additive such as metal, carbon, or conductive polymeric particles or fibers within a non-conductive material or coating the non-conductive material with a conductive coating such as a metal or carbon coating.

The ends of the wrap structure 105, the final classifier 104, the coalescing matrix 103, and the core 101 may be joined to opposite end caps 110, 111 in any suitable manner, such as melt bonding, adhesive bonding, spin bonding, welding, or brazing. One of the end caps may be blind and the other may be open or both end caps may be open.

The conductive layers such as the conductive wrap 105 and the conductive core 101 are preferably electrically connected to one another and may be electrically connected to each other in a variety of ways. For example, they may be electrically connected in many of the same ways that the conductive layers of the filter packs and the filter elements previously discussed are connected. For example, one of the conductive layers, e.g., the wrap structure 105, may physically contact the other conductive layer, e.g., the conductive core 101, at the ends of the conductive layers adjacent to the end caps. Alternatively or additionally, the first and second conductive layers may be electrically connected through the intervening layers. For example, the final classifier 104 and the coalescing matrix 103 may include conductive fibers including conductive filaments which electrically connect one of the conductive layers to the other conductive layer across the entire area of the final classifier 104 and the coalescing matrix 103. Alternatively, or additionally, the first and second conductive layers may be electrically coupled via a conductive end cap, e.g., a metal end cap or a conductive polymeric end cap, and/or via a conductive adhesive at the end caps 110, 111. With the first and second conductive layers electrically connected to each other, the fluid treatment medium such as the coalescing medium 102 is substantively surrounded with an electrical cage.

While the embodiment illustrated in FIG. 5 has been described with reference to a fluid treatment element comprising a conductive core 101, a fluid treatment medium such as a coalescing medium 102 including a coalescing matrix 103 and a final classifier 104, and a conductive wrap structure 105 arranged in a cylindrical configuration, the invention is not limited to this embodiment. For example, one or more of the layers, such as the final classifier, may be eliminated entirely and/or additional layers, such as a drainage layer between the coalescing medium and the perforated core or a substrate on which the coalescing matrix is laid, may be added. Further, the core may be non-conductive or it may be electrically isolated from the second conductive layer, and the first conductive layer may comprise a conductive drainage layer or a conductive substrate. Further, the wrap structure may be non-conductive or eliminated, and the second conductive layer may comprise a conductive final classifier, a conductive screen wrapped around the coalescing matrix or a conductive outer retainer such as a metal cage or a metal screen disposed around the exterior of the coalescer element. Additionally, the coalescer element may have a non-cylindrical geometry, e.g., a box-shaped configuration.

A fluid treatment element comprising the coalescer element 100 may be placed in a housing (not shown) of a fluid treatment assembly comprising a coalescer assembly or a combination coalescer and separator assembly. In one embodiment, the fluid treatment element includes an electrical contact, and the first and second conductive layers preferably are electrically connected to each other and are electrically coupled to the electrical contact, which is arranged to be connected to a neutral potential, e.g., ground. The first and second conductive layers may be electrically coupled to the electrical contact and the electrical contact may be electrically coupled to the neutral potential in any suitable manner, for example, as previously discussed with respect to filter elements.

In another embodiment, the first and second layers may be electrically connected to each other and isolated, e.g., insulated, from a common or neutral potential such as ground. The first and second conductive layers may be isolated in any suitable manner, for example, as previously discussed with respect to the filter elements.

In a preferred mode of operation, the fluid to be treated is directed through the housing of the fluid treatment assembly and through the fluid treatment element, e.g., inside out through coalescer element 100 in a dead-end mode of coalescence. The fluid is distributed by the perforated conductive core 101 along the upstream surface of the coalescing matrix 103. The fluid then passes through the fluid treatment medium, e.g., the coalescing matrix 103 and the final classifier 104, where droplets of the discontinuous phase are formed and accreted. The droplets of the discontinuous phase then pass through the holes of the conductive wrap structure 105 while the continuous phase passes through the porous material of the wrap structure 105.

While not being bound by any particular theory of operation, it is believed that as the fluid passes through the fluid treatment element comprising the coalescing element 100, in particular, as a conductive or non-conductive fluid passes through the coalescer medium 102, electrical charge may be transferred between the coalescer medium 102, e.g., the coalescing matrix 103 and/or the final classifier 104, and the fluid. The first and second conductive layers comprising the perforated conductive core 101 and the conductive wrap structure 105 are positioned in sufficiently close proximity to the fluid treatment medium, e.g., the coalescing medium 102, to offset any electrical imbalance, e.g., to gather the electrical charge from the coalescing matrix 103 and/or the final classifier 104 and dissipate the charge to ground or return the charge to the fluid and/or to prevent the charge from accumulating in the coalescing medium 102. For example, one or both of the first and second conductive layers may be immediately adjacent and in face-to-face contact with the fluid treatment medium, e.g., the coalescing medium 102. This configuration is preferred because it enhances the electrical coupling between the coalescing medium 102 and the conductive layer(s) over the entire surface of the fluid treatment medium. Alternatively, one or more non-conductive layers may be interposed between the fluid treatment medium and each of the first and second conductive layers of the coalescing element 100 as long as the first and/or second conductive layers are sufficiently close to the fluid treatment medium to inhibit any electrical imbalance and/or charge build-up through the intervening layer. The electrical imbalance and/or charge build-up in the fluid treatment medium such as the coalescing medium 102 is thus substantially reduced.

While the embodiment illustrated in FIG. 5 has been described with reference to a generally cylindrical coalescer element 100 with a core 101 permanently attached to the element 100, the invention is not limited to this embodiment. For example, the conductive core may be permanently attached to and electrically connected to the housing, and the coalescer element may be removably mounted to the conductive core. The conductive core may be electrically connected to the other conductive layer, e.g., the conductive wrap structure 105, in any suitable manner. For example, the other conductive layer may electrically contact one or more conductive end caps and the conductive end caps may physically contact the conductive core or may be electrically connected to the core via a conductive spring, wire, strap, or a conductive seal such as a conductive O-ring. Alternatively, the core may be non-conductive, and an inner conductive layer, such as a conductive drainage layer or substrate, may be disposed adjacent to the coalescing medium and electrically coupled to the outer conductive layer, e.g., via conductive end caps.

In accordance with another aspect of the invention, a fluid treatment element comprises one or more layers including a coalescer medium arranged to form droplets of a discontinuous phase of a fluid flowing through the fluid treatment element. At least one of the layers of the fluid treatment element is conductive, and the fluid treatment element further comprises an electrical contact which is electrically coupled to the conductive layer of the fluid treatment element. The electrical contact is arranged to be connected to a conductive portion of a fluid treatment assembly, e.g., the housing of a coalescer assembly, which, in turn, is connected to a common or neutral potential such as ground. As the fluid flows through the fluid treatment assembly and, hence, through the fluid treatment element, the discontinuous phase of the fluid is coalesced by the coalescing medium. In addition, an electrical charge may be transferred between the fluid and the coalescing medium. Because the fluid treatment element includes a conductive layer coupled to a neutral potential via an electrical contact, any charge imbalance and/or build-up which may arise in the coalescer medium and/or the fluid can be substantially offset, e.g., reduced or prevented, by the connection to the neutral potential.

Figure 6:
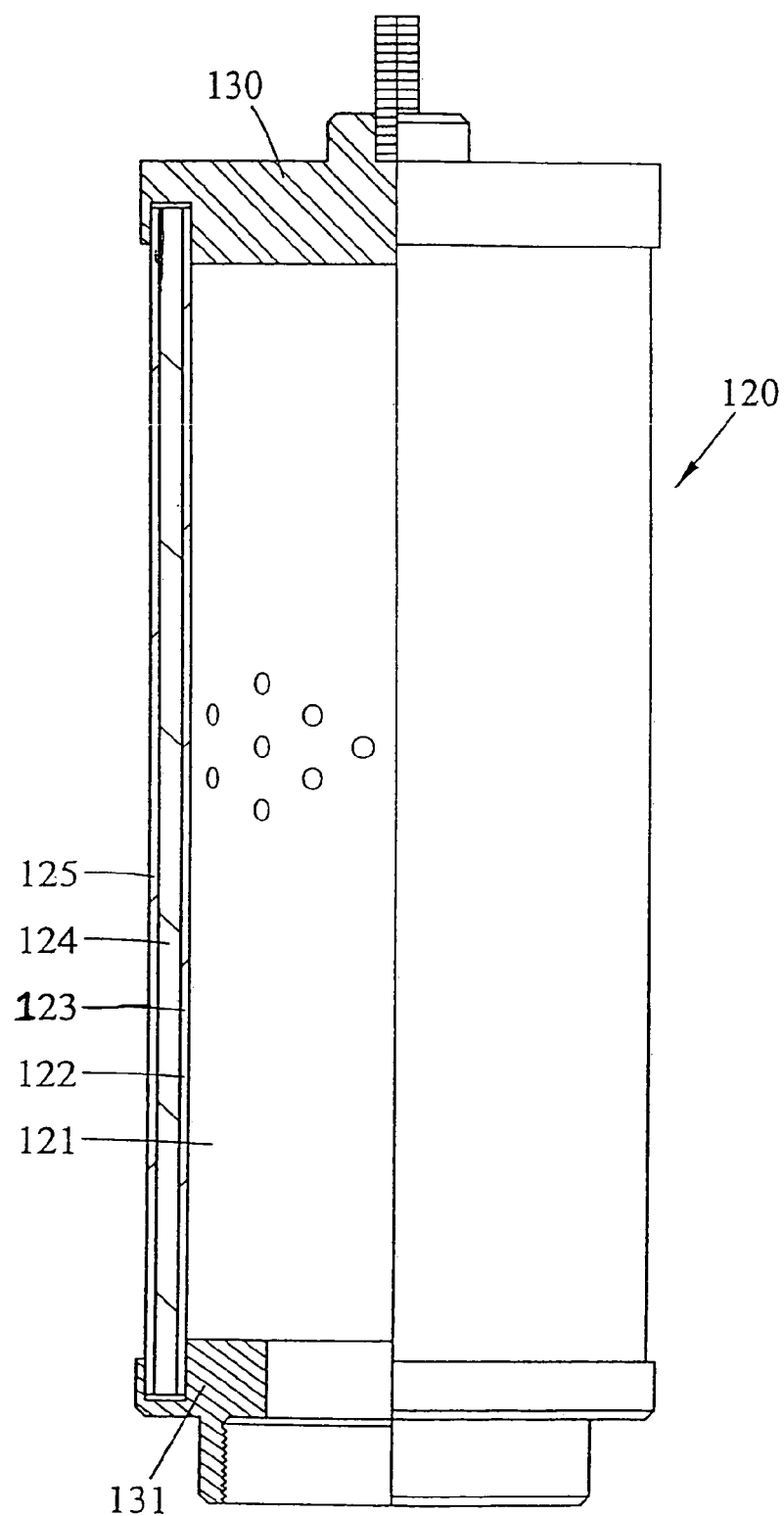
FIG. 6 is a partially cutaway elevation view of another fluid treatment element.

As shown in FIG. 6, one example of a fluid treatment element, e.g., a coalescer element 120, embodying the present invention comprises a perforated core 121, a coalescer medium 122, and a perforated wrap structure 125 disposed between opposite end caps 130, 131. The coalescer medium 122 preferably includes a packing material or coalescing matrix 123 and a final classifier 124. Each of the components of the coalescer element 120 may be similar to the components of the coalescer element 100 previously described.

However, in accordance with this aspect of the invention, one or more of the layers of the coalescer element 120 are conductive. For example, at least one of the core 121, the coalescing matrix 123, the final classifier 124, and the perforated wrap structure 125 are conductive and comprise the conductive layer of the fluid treatment. Any of these layers may be formed from a conductive material or may be rendered conductive in a manner similar to those previously described which respect to the filter packs and the filter elements. In a preferred embodiment, the coalescing matrix 123 is blown onto a conductive, perforated, stainless steel core 121 and the conductive core 121 comprises the only conductive layer of the fluid treatment element. Alternatively, the coalescing matrix or the final classifier or the perforated wrap structure may each comprise the sole conductive layer, or any two, three or four of the core, the coalescing matrix, the final classifier, and the perforated wrap may comprise conductive layers. The conductive layer(s) is preferably in sufficiently close proximity to the coalescing medium 122, e.g., the coalescing matrix 123, to gather the electrical charge transferred between the fluid and the coalescing medium 122. Preferably, the conductive layer is in face-to-face contact with the coalescer medium 122 or matrix 123. While the coalescing medium itself may be conductive or may be rendered conductive, the coalescing medium is preferably fashioned in manner which enhances the physical and/or chemical characteristics, e.g., critical surface energy, that facilitate coalescence and, therefore, the coalescing medium may be non-conductive.

The electrical contact, which may be similar to the electrical contacts previously described for the filter elements, preferably comprises any conductive portion of the fluid treatment element, e.g., the coalescer element 120, which is electrically coupled to the conductive layer(s) and is arranged to contact a conductive portion of the fluid treatment assembly, e.g., the housing of a coalescer assembly. For example, the electrical contact may be a portion of the conductive core that is electrically connected to a conductive portion of the housing, e.g., a stool, a spider, or a tie rod of the housing. Alternatively or additionally, the electrical contact may be a conductive portion of a conductive end cap that is electrically coupled to the conductive layer(s) of the coalescer element, e.g., directly or via a conductive bonding agent, and to a conductive portion of the housing. Alternatively or additionally, the electrical contact may comprise one or more additional conductive components such as a conductive wire, strap, spring or seal, e.g., a conductive O-ring or gasket, that is electrically coupled to the coalescer medium via the conductive layer of the coalescer element, e.g., directly or via a conductive bonding agent and/or a conductive end cap, and to a conductive portion of the housing. Alternatively or additionally, the coalescer medium may be pleated and electrical contact may comprise a conductive portion at the roots or crests of the pleated coalescer medium or substrate that is electrically connected to the housing, e.g., to a conductive core or a conductive cage permanently connected to the housing.

Figure 7:
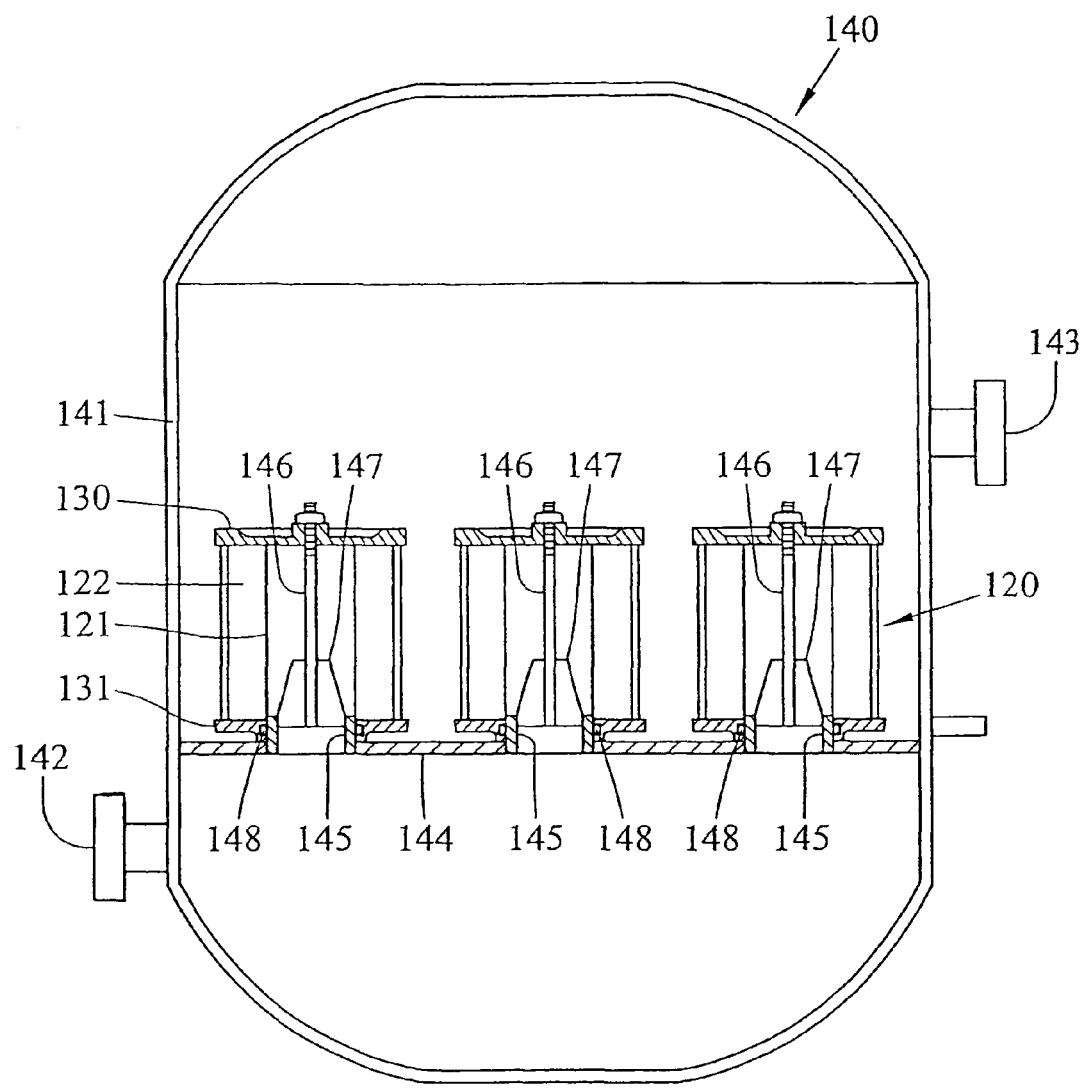
FIG. 7 is an elevation view of a fluid treatment assembly.

As shown in FIG. 7, one example of a fluid treatment assembly, e.g., a coalescer assembly 140 includes a housing 141 having an inlet 142, an outlet 143 and a tube sheet 144 including a plurality of stools 145. A coalescer element 120 is mounted to a hub on each stool 145, for example, by a tie rod 146 and a spider 147. The coalescer element 120 includes a conductive core 121 electrically connected to opposite conductive end caps 130, 131. A portion of the upper end cap 130 serves as the electrical contact electrically coupling the coalescer medium 122 via the conductive core 121 to the tie rod 146 and, hence, to ground. In addition, a conductive O-ring 148 mounted to the lower end cap 131 serves as the electrical contact electrically coupling the coalescer medium 122 via the conductive core 121 to the stool 145 and, hence, to ground.

In a preferred mode of operation, the fluid to be treated is directed through the housing of the fluid treatment assembly and through the fluid treatment element, e.g., inside out through the coalescer element 120 in a dead-end mode of coalescence. The fluid is distributed by the perforated conductive core 121 along the upstream surface of the fluid treatment medium, e.g., the coalescer medium 122. The fluid then passes through the coalescer medium 122, e.g., the coalescing matrix 123 and the final classifier 124, where droplets of the discontinuous phase are formed and accreted. The droplets of the discontinuous phase then pass through the holes of the wrap structure 125 while the continuous phase passes through the porous material of the wrap structure 125.

While not being bound by any particular theory of operation, it is believed that as the fluid passes through the fluid treatment element comprising the coalescing element 120, in particular, as a conductive or non-conductive fluid passes through the coalescing medium 122, electrical charge may be transferred between the coalescer medium 122, e.g., the coalescing matrix 123 and/or the final classifier 124, and fluid. By coupling the electrical contact to the coalescer medium 122 via the conductive layer of the coalescer element 120, e.g., the conductive core 121, and to the grounded housing, any charge imbalance and any charge build-up in either the coalescer medium 122 or the fluid may be substantially reduced or prevented entirely.

While the embodiment illustrated in FIG. 6 has been described with reference to a generally cylindrical coalescer element 120 having a core 121 permanently mounted to the coalescer element 120, a coalescer matrix 123, a final classifier 124, and a perforated wrap structure 125, the invention is not limited to this embodiment. For example, the core may be permanently attached to a housing and the coalescer may be removably mounted to the core. Further, one or more layers, such as the final classifier or the perforated wrap structure, may be eliminated entirely and/or other conductive or non-conductive layers may be added, including a drainage layer between the coalescing medium and the perforated core, a substrate on which the coalescing matrix is laid, a screen wrapped around the downstream surface of the coalescing matrix, or an outer retainer, e.g., a cage or a screen disposed around the exterior of the coalescer element. Additionally, the coalescer element may have a non-cylindrical geometry, e.g., a box-shaped configuration.

Figure 8:
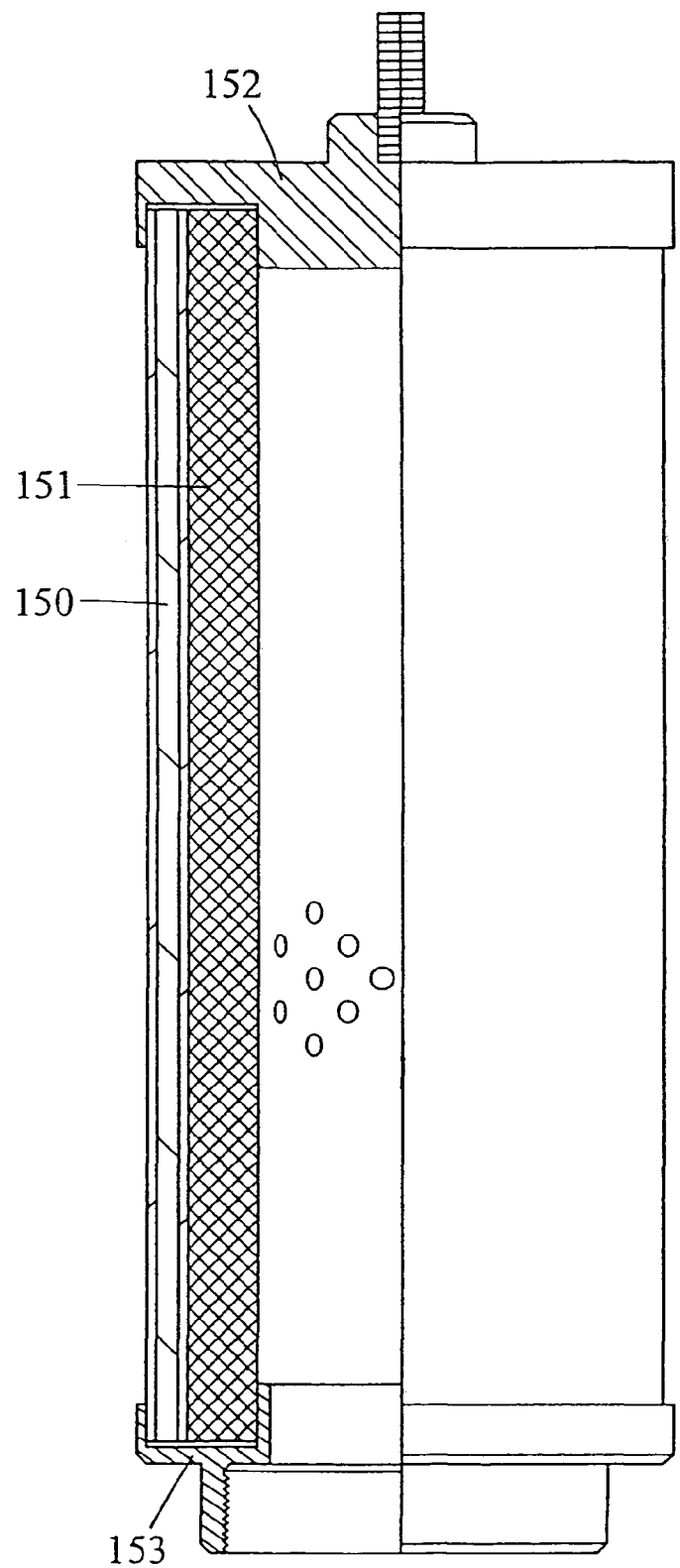
FIG. 8 is a partially cutaway elevation view of another fluid treatment element.

As shown in FIG. 8, another example of a fluid treatment element includes a coalescer element 150 disposed adjacent to and preferably downstream of a filter element 151. The coalescer element 150 and the filter element 151 may be fixably mounted adjacent to one another between opposite end caps 152, 153 or may be removably mounted as disclosed, for example, in International Publication No. WO 96/33789 and U.S. application No. 60/145,213, both of which are incorporated by reference. Both the coalescer element 150 and the filter element 151 may include any of the previously described mechanisms for dissipating, transferring, and/or preventing the accumulation of electrical charge in the fluid treatment medium.

Another example of a fluid treatment element is a separator element which resists or prevents the passage of one phase of a fluid, e.g., a liquid discontinuous phase, but allows the passage of another phase, e.g., a liquid or gas continuous phase, through the separator element. In accordance with another aspect of the invention, a fluid treatment element such as a separator element comprises first and second conductive layers and a porous fluid treatment medium such as a separator medium. The first and second conductive layers are preferably electrically connected to each other and the separator medium is disposed between them. The fluid is directed toward the separator element and the separator medium resists or prevents passage of the discontinuous phase but allows passage of the continuous phase through the separator element. In addition, an electrical charge may be transferred between the fluid and the separator medium. The first and second conductive layers are positioned in sufficiently close proximity to the separator medium to offset any electrical imbalance, for example, by dissipating the charge and/or collecting the charge in the separator medium and returning the charge to the fluid as it flows through the conductive layers or by preventing the charge from accumulating in the separator medium. Thus, even if the separator element is electrically isolated from the ambient environment, e.g., electrically isolated from a common or neutral potential such as ground, the first and/or second conductive layers may offset all or a substantial portion of the electrical imbalance which may arise in the separator medium. The separator medium is thus substantially surrounded by an electrical cage which offsets, e.g., reduces, inhibits or prevents the electrical imbalance.

One example of a fluid treatment element such as a separator element embodying the present invention has a hollow, generally cylindrical configuration and fluid flows inside-out or, preferably, outside-in through the separator element. The separator element preferably comprises a perforated conductive core and an outer conductive mesh. A separator medium such as a single layer of a material which is liquiphobic with respect to the discontinuous phase and liquiphilic with respect to the continuous phase is disposed between the perforated core and the outer mesh. The outer mesh and the perforated core are preferably electrically connected at the ends of the separator element, e.g., via direct physical contact or via conductive end caps or bonding agents.

While not being bound by any particular theory of operation, it is believed that as the continuous phase of a fluid passes through the fluid treatment element comprising the separator element; in particular, as a conductive or non-conductive fluid passes through a separator medium, an electrical charge may be transferred between the separator medium and the fluid. The first and second conductive layers comprising the perforated conductive core and the conductive outer sleeve are positioned in sufficiently close proximity to the fluid treatment medium, e.g., the separator medium, to offset any electrical imbalance, e.g., to gather the electrical charge from the separator medium and return the charge to the fluid and/or to prevent the charge from accumulating in the separator medium.

In accordance with another aspect of the invention, a fluid treatment element comprises one or more layers including a separator medium arranged to inhibit or prevent the passage of a discontinuous phase while allowing the passage of a continuous phase of a fluid. At least one of the layers of the fluid treatment element is conductive, and the fluid treatment element further comprises an electrical contact which is electrically coupled to the separator medium via the conductive layer of the fluid treatment element. The electrical contact is arranged to be connected to a conductive portion of the fluid treatment assembly, e.g., the housing of a separator assembly, which, in turn, is connected to a common or neutral potential such as ground. As the continuous phase flows through the fluid treatment assembly, and, hence, through the separator medium, an electrical charge may be transferred between the fluid and the separator medium. Because the fluid treatment element includes a separator medium coupled to a neutral potential via the conductive layer and the electrical contact, any charge imbalance and/or build-up which may arise in the separator medium and/or the fluid can be substantially offset by the connection to the neutral potential.

One example of a fluid treatment element, e.g., a separator element embodying the present invention comprises a conductive perforated core and a single layer of a separator medium disposed around the core and preferably in intimate contact with the core. The separator medium may be conductive or non-conductive. The ends of the conductive core and the separator medium may be disposed between opposite end caps. The electrical contact, which may be similar to the electrical contacts previously described with respect to the coalescer elements and the filter elements, may be a portion of the conductive core that is electrically connected to a conductive portion of the housing; the electrical contact may be a conductive portion of a conductive end cap that is electrically coupled between the conductive core and the conductive portion of the housing; and/or the electrical contact may be an additional conductive component such as a conductive wire, strap, spring or seal, e.g., a conductive O-ring or gasket, that is electrically coupled between the conductive core and a conductive portion of the housing. As the continuous phase of the fluid flows through the separator medium, any electrical charge imbalance and/or build-up in the separator medium is coupled to ground via the conductive core and the electrical contact.

The conductive components of the present invention, including but not limited to the conductive drainage layers, cushioning layers, fluid treatment media, substrates and/or wrap members, as well as the conductive end caps, cage, core, seals, sealant and/or end cap bonding composition, preferably have high electrical conductivity or low electrical resistivity. For example, the conductive components preferably have a surface resistivity on the order of about $10^{10}$ ohms/square or less, preferably on the order of about $10^6$ ohms/square or less, more preferably on the order of about $10^4$ ohms/square or less, e.g., from about $1\times10^3$ ohms/square or less to about $7\times10^3$ ohms/square or more. Alternatively or additionally, the conductive components preferably have a resistivity on the order of about $10^{12}$ ohm-centimeters or less, most preferably $10^{10}$ ohm-centimeters or less. The resistivity including the surface resistivity can be determined by methods known to those skilled in the art, e.g., by ASTM Method D257 and/or D4496.

The various aspects of the invention have been described with respect to many embodiments. However, the invention is not limited to these embodiments. For example, one or more of the features of any of these embodiments may be combined with one or more of the features of the other embodiments without departing from the scope of the invention. Further, one or more of the features of any of these embodiments may be modified or omitted without departing from the scope of the invention. Accordingly, the various aspects of the invention include all modifications encompassed within the spirit and scope of the invention as defined by the following claims.

The invention claimed is:

1. A fluid treatment element for substantially inhibiting an electrical charge imbalance and/or a build-up of electrical charge, the fluid treatment element comprising a multilayer composite including:
   an electrically conductive fibrous matrix having a first side and a second side, the electrically conductive fibrous matrix including a combination of electrically conductive fibers and electrically nonconductive fibers, wherein the electrically conductive fibers of the electrically conductive fibrous matrix substantially inhibit an electrical charge imbalance and/or a build-up of electrical charge and include electrically conductive carbon fibers, the electrically conductive fibers comprising less than about 50% by weight of the electrically conductive fibrous matrix and having diameters of about 10 µm or less;
   a porous substrate for supporting the electrically conductive fibrous matrix and having a first side and a second side, wherein the second side of the electrically conductive fibrous matrix is disposed on the first side of the porous substrate; and
   a first drainage layer positioned on the first side of the electrically conductive fibrous matrix or the second side of the porous substrate.

2. The fluid treatment element according to claim 1, wherein the electrically conductive fibers comprise up to about 25% by the weight of the electrically conductive fibrous matrix.

3. The fluid treatment element according to claim 1, wherein the electrically conductive fibers comprise from about 15% to about 25% by weight of the electrically conductive fibrous matrix.

4. The fluid treatment element according to claim 1, wherein the electrically conductive fibrous matrix includes a binder.

5. The fluid treatment element according to claim 1, wherein the porous substrate is electrically conductive.

6. The fluid treatment element according to claim 1, wherein the electrically nonconductive fibers include glass fibers, electrically nonconductive polymeric fibers, or electrically nonconductive ceramic fibers.

7. The fluid treatment element according to claim 1, wherein the electrically conductive fibrous matrix has a removal rating of about 25 μm or less.

8. The fluid treatment element according to claim 1, further comprising a cushioning layer having a first side and a second side, wherein the second side of the cushioning layer is positioned on and in contact with the first side of the electrically conductive fibrous matrix, wherein the first drainage layer has a first side and a second side, and wherein the second side of the first drainage layer is positioned on and in contact with the first side of the cushioning layer.

9. The fluid treatment element according to claim 8, wherein the cushioning layer is electrically conductive.

10. The fluid treatment element according to claim 1, wherein the multilayer composite is pleated.

11. The fluid treatment element according to claim 1, wherein the electrically conductive fibers of the electrically conductive fibrous matrix have diameters of about 3 μm or less.

12. The fluid treatment element according to claim 1, wherein the electrically conductive fibers of the electrically conductive fibrous matrix have diameters of about 1 μm or less.

13. The fluid treatment element according to claim 1, wherein the first drainage layer is electrically conductive.

14. The fluid treatment element according to claim 1, further comprising a second drainage layer positioned on the second side of the porous substrate, wherein the multilayer composite is pleated.

15. The fluid treatment element according to claim 14, wherein the electrically conductive fibers include electrically conductive carbon fibers which have diameters of about 1 μm or less.

16. The fluid treatment element according to claim 15, wherein the electrically conductive fibrous matrix and the porous substrate together form a filter medium.

17. The fluid treatment element according to claim 1, wherein the electrically conductive fibrous matrix and the porous substrate together form a filter medium.

18. The fluid treatment element according to claim 1, wherein the electrically non-conductive fibers include glass fibers.

\* \* \* \* \*